US012061951B1

(12) United States Patent
Vaassen et al.

(10) Patent No.: US 12,061,951 B1
(45) Date of Patent: Aug. 13, 2024

(54) DECIPHERING MATRIX CODE VIA AN IMAGE SENSOR FOR EMBEDDED VARIABLE IDENTIFICATION FACILITATING ITEM SELECTION

(71) Applicant: Truist Bank, Charlotte, NC (US)

(72) Inventors: Brent William Vaassen, Clemmons, NC (US); Dirk Evan Gould, Rancho Santa Margarita, CA (US); Dustin Tyler Jennings, Lewisville, NC (US); Jared Stephen Bunn, Clemmons, NC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/303,250

(22) Filed: Apr. 19, 2023

(51) Int. Cl.
*G06K 7/14* (2006.01)
*G06K 7/10* (2006.01)
*H04N 25/70* (2023.01)

(52) U.S. Cl.
CPC ....... *G06K 7/1417* (2013.01); *G06K 7/10722* (2013.01); *H04N 25/70* (2023.01)

(58) Field of Classification Search
CPC ... G06K 7/1417; G06K 7/10722; H04N 25/70
USPC ........................................................ 235/451
See application file for complete search history.

(56) References Cited

U.S. PATENT DOCUMENTS

| | | | | |
|---|---|---|---|---|
| 2003/0046179 A1* | 3/2003 | Anabtawi | .......... | G06Q 30/0621 705/26.5 |
| 2015/0302474 A1* | 10/2015 | Lampert | ............ | G06Q 30/0601 705/14.53 |
| 2015/0348589 A1* | 12/2015 | Barisano, III | ...... | G06F 3/04847 715/720 |

* cited by examiner

*Primary Examiner* — Daniel A Hess
(74) *Attorney, Agent, or Firm* — Michael A. Springs, Esq.; Shumaker, Loop & Kendrick, LLP; Patrick B. Horne

(57) ABSTRACT

Systems and methods detect presence of a scannable object comprising readable matrix code within an image captured by an optical instrument, the detecting comprising defining a bounding region encompassing the scannable object. Pattern recognition is contemporaneously performed on the readable matrix code of the scannable object to decipher the readable matrix code and identify data modules embedded within the scannable object, where the data modules include encoded data comprising embedded variable(s). Encoded data are transmitted to an external server to initiate server operation(s) comprising data processing to, at least in part, select, based on analyzing the one or more embedded variables, an item determined to be available to the user from one or more selectable items potentially available to the user, and generate element data comprising an interactive element associated with the selected item. The element data is received and a representation of the interactive element is digitally displayed.

14 Claims, 15 Drawing Sheets

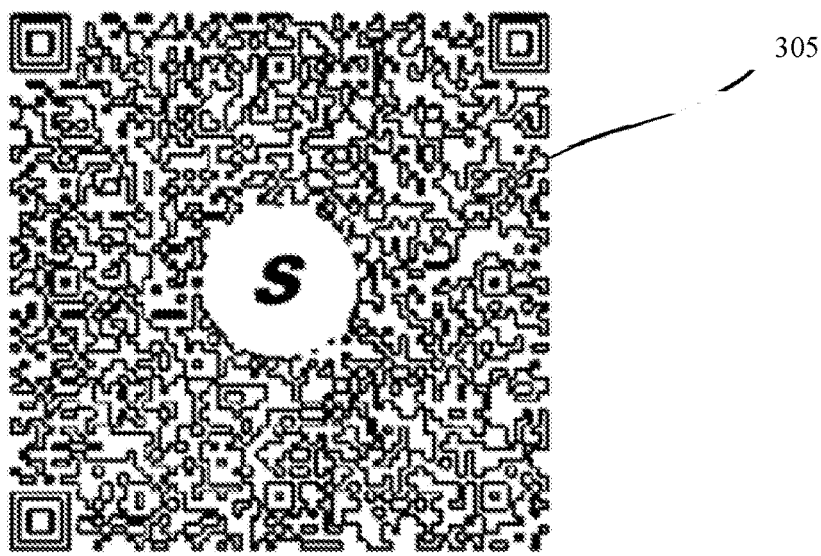
FIG. 3

500 502

New Loan Application Enterprise – Product Retailer A    🖶 Blank Application

Product Information

⦿ Individual Applicant    ○ Joint Applicant
⦿ New    ○ Used

504

┌─ *Manufacturer ─────────────┐    ┌─ *Model Type ─────────────┐ 506
│ Select a Manufacturer    ⌄ │    │ Select    ⌄ │
└────────────────────────────┘    └────────────────────────────┘

508
┌─ *Subtype ──────────────────────────────────────────────────────┐
510 │ Select    ⌄ │
└──────────────────────────────────────────────────────────────────┘

☐ I have the details about the vehicle or product that I'm financing

○ *Consumer / Personal / Household Life    ○ *Commercial Business Use    ☐ Loan in Business Name 512A ┌─ *Amount Requested ─────────────┐
│ │
└──────────────────────────────────┘
512B    512C

Primary Applicant

514 ┌─ *Social Security ───────────────────────────────────────────────┐
│ │
└──────────────────────────────────────────────────────────────────┘

┌─ *First Name ──┐ ┌─ Middle Name ──┐ ┌─ *Last Name ──┐ ┌─ Suffix ──┐
│ │ │ │ │ │ │ Select ⌄ │
└────────────────┘ └────────────────┘ └────────────────┘ └───────────┘

516 ┌─ *Present Street Address (Not P.O. Box) ─────┐ ┌─ *City ──────┐
│ │ │ │
└──────────────────────────────────────────────┘ └──────────────┘

┌─ *State ─────────────────────┐ ┌─ *Zip ──────┐
│ Select    ⌄ │ │ │
└──────────────────────────────┘ └─────────────┘

┌─ *Date of Birth ──┐ ┌─ Day ──┐ ┌─ Year ──┐
│ Month    ⌄ │ │ Day ⌄ │ │ Year ⌄ │
└───────────────────┘ └────────┘ └─────────┘

Mailing Information

☐ Mailing address is different from primary account address

FIG. 5A

518 {
- *Mailing Address
- *Mailing Address City
- *Mailing Address State [Select ⌄]
- *Mailing Address ZIP
}

Contact Information

520 {
- *Residential Status [Select ⌄]
- *Monthly Housing/Rent Payment
- *Years at Residence
- *Applicant Email Address
- *Home Phone
- Mobile Phone
}

Employer Information

522 {
- *Employment Status [Select ⌄]
- *Monthly Gross
- *Current Employer's Name
- *Current Employer's City
- *Years at Employment
- *Work Phone
}

Nearest Relative Information

524 {
- *Nearest Relative's Name
- *Nearest Relative's City
- *Nearest Relative's State [Select ⌄]
- *Nearest Relative's Phone Number
}

526 — Agreements

☐ By checking this box you agree that you have read and acknowledge the following disclosures E-sign Act Disclosure, General Application Disclosures, COPPA Disclosure and Privacy Policy

RESET FORM  NEXT
528           530

FIG. 5B

DECIPHERING MATRIX CODE VIA AN IMAGE SENSOR FOR EMBEDDED VARIABLE IDENTIFICATION FACILITATING ITEM SELECTION

FIELD OF THE INVENTION

This invention relates generally to the field of deciphering matrix code, and more particularly embodiments of the invention relate to systems and methods of deciphering matrix code via an image sensor for embedded variable identification facilitating item selection.

BACKGROUND OF THE INVENTION

Accessing credit from financial institutions provides consumers with the flexibility to obtain products and services now with a promise to make payments and pay off the products and services later. This financial flexibility may allow for economic growth by allowing consumers to make purchases and obtain products and services they may not otherwise be able to obtain. In order to obtain credit to make certain purchases, oftentimes consumers apply for a loan or a credit card. Generally, in order to qualify to receive a loan or a credit card, the consumer needs to provide various information about themselves and/or the purchase. For instance, with particularly high value product purchases such as a house, vehicle, etc. lending institutions may require information about the item being purchased. For example, if the item being purchased is a vehicle, the lending institution may require information about the make, model, year, mileage, etc. in order to determine how much financial capital to lend to the consumer so that the consumer can purchase the vehicle.

Oftentimes, consumers may not be aware of the financing options available to them in order to make certain purchases. In other instances, may believe that accessing financing options can be inconvenient or cost prohibitive. Thus, a need exists to improve consumer's awareness, accessibility, and convenience associated with obtaining financial capital.

BRIEF SUMMARY

Shortcomings of the prior art are overcome and additional advantages are provided through the provision of a computing system for data processing associated with a data submission form. The computing system includes one or more processors in communication with a memory and program instructions stored by the memory and executable by the one or more processors to, at least in part, detect, via the image sensor of an optical instrument of a user device, presence of a scannable object within an image captured by the optical instrument, the detecting comprising defining a bounding region encompassing the scannable object and the scannable object comprising readable matrix code. Pattern recognition is contemporaneously performed, via the image sensor and based on detecting the presence of the scannable object, on the readable matrix code of the scannable object to decipher the readable matrix code and identify data modules embedded within the scannable object, wherein the data modules comprise encoded data comprising one or more embedded variables. The encoded data comprising the one or more embedded variables are transmitted, via a network and based on detecting the data modules from the scannable object, to an external server to initiate one or more server operations comprising data processing to, at least in part, (i) select, based on analyzing the one or more embedded variables, an item determined to be available to the user from one or more selectable items potentially available to the user, and (ii) generate element data comprising an interactive element associated with the selected item. The element data comprising the interactive element associated with the selected item are received via the external server, and a representation of the interactive element associated with the selected item is digitally displayed via a user interface of the user device.

Additionally, disclosed herein is a computer system for variable data transmission that includes one or more processors in communication with a memory and program instructions stored by the memory and executable by the one or more processors to, at least in part, scan, via an optical instrument of a user device, a scannable object comprising matrix code, the optical instrument comprising the image sensor and the scanning including using the image sensor of the optical instrument to decipher the matrix code, wherein the scannable object is associated with a purchasable product or service. Further, in response to scanning the scannable object, element data comprising an item identified as being relevant to the purchasable product or service is received via an external server, where the element data comprises an interactive element associated with the identified item. A visual representation of the interactive element is displayed via a user interface of a user device. Additionally, in response to a user of the user device selecting the visual representation of the interactive element, a digital landing page configured to provide access to a digital data submission form is displayed to facilitate purchasing the purchasable product or service, where the digital landing page displays the identified item.

Also disclosed herein is a computer-implemented method for data processing associated with a data submission form. According to embodiments of the invention, the computer-implemented method includes, at least in part, detecting, via the image sensor of an optical instrument of a user device, presence of a scannable object within an image captured by the optical instrument, the detecting comprising defining a bounding region encompassing the scannable object and the scannable object comprising readable matrix code. Further, the method includes contemporaneously performing, via the image sensor and based on detecting the presence of the scannable object, pattern recognition on the readable matrix code of the scannable object to decipher the readable matrix code and identify data modules embedded within the scannable object, wherein the data modules comprise encoded data comprising one or more embedded variables. Based on detecting the data modules from the scannable object, the method also includes transmitting, via a network, the encoded data comprising the one or more embedded variables to an external server to initiate one or more server operations comprising data processing to, at least in part, (i) select, based on analyzing the one or more embedded variables, an item determined to be available to the user from one or more selectable items potentially available to the user, and (ii) generate element data comprising an interactive element associated with the selected item. In addition, the method includes, receiving, via the external server, the element data comprising the interactive element associated with the selected item, as well as digitally displaying, via a user interface of the user device, a representation of the interactive element associated with the selected item.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

FIG. 3 depicts an example scannable image comprising variable data embedded therein, in accordance with an embodiment of the present invention;

FIG. 5A depicts a first portion of an example data submission form, in accordance with an embodiment of the present invention;

FIG. 5B depicts a second portion of the example data submission form of FIG. 5A, in accordance with an embodiment of the present invention;

DETAILED DESCRIPTION

Figure 1:
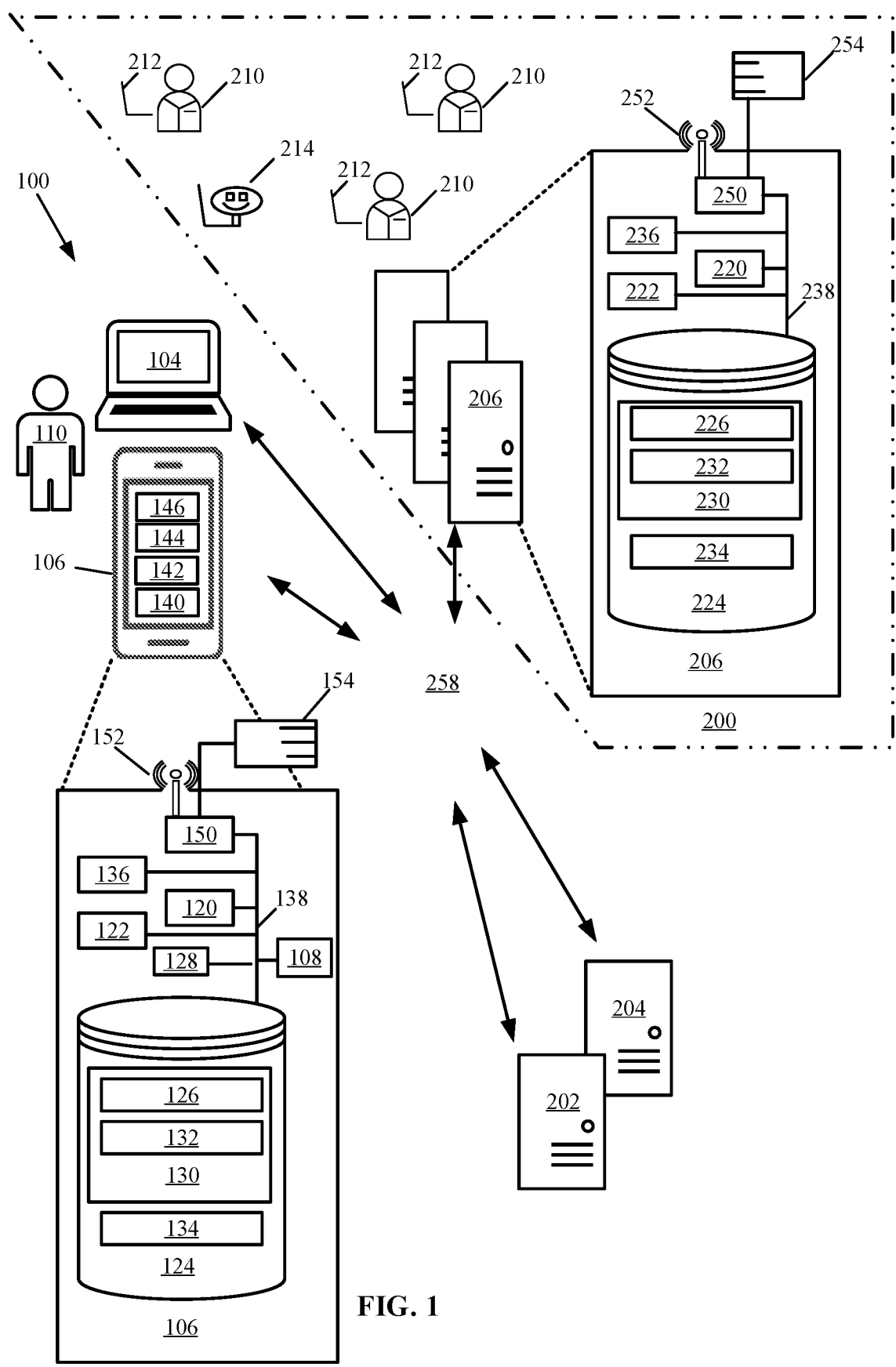
FIG. 1 illustrates a computing system, and environment thereof, for data processing associated with a data submission form, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment", "an embodiment", "various embodiments", "one or more embodiments", etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

Like numbers refer to like elements throughout. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "couple", "coupled", "couples", "coupling", "fixed", "attached to", and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about", "approximately", or "substantially" for any numerical values or ranges indicate a suitable dimensional tolerance that allows the device, part, or collection of components to function for its intended purpose as described herein.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise that hosts, maintains, or uses computer systems that provide functionality for the disclosed systems and methods. In particular, the term "enterprise" may generally describe a person or business enterprise providing goods or services. Interactions between an enterprise system and a user device can be implemented as an interaction between a computing system of the enterprise and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with an external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein, with reference to flowchart illustrations and/or block diagrams of computer-implemented methods and computing systems according to embodiments of the invention. Each block of the flowchart illustrations and/or block diagrams, and combinations of blocks in the flowchart illustrations and/or block diagrams, may represent a module, segment, a specific instruction/function or portion of instructions/functions and can be implemented by computer readable program instructions that may be provided to a processor of a general purpose computer, special purpose computer, or other programmable data processing apparatus or apparatuses (the term "apparatus" includes systems and computer program products). In particular, the computer readable program instructions, which execute via the processor of the computer or other programmable data processing apparatus, create a means for implementing the functions/acts specified in the flowchart and/or block diagram block or blocks. Additionally, alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, or the functions of the blocks may sometimes be executed in the reverse order, depending upon the functionality involved.

In one embodiment, these computer readable program instructions may also be stored in a computer-readable storage medium that can direct a computer or other programmable data processing apparatus, and/or other devices, to function in a particular manger, such that the computer readable storage medium having instructions stored therein comprises an article of manufactured including instructions which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block or blocks.

Alternatively, in another embodiment, these computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions, whether stored in the computer-readable storage medium and/or computer-readable memory may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

FIG. 1 illustrates a computing system 100 and environment thereof, according to at least one embodiment. The computing environment generally includes a user 110 that benefits through use of services and products offered by a provider through an enterprise system 200. The computing environment may include, for example, a distributed cloud computing environment (private cloud, public cloud, community cloud, and/or hybrid cloud), an on-premise environment, fog-computing environment, and/or an edge-computing environment. The user 110 accesses services and products of the enterprise system 200 by use of one or more user devices 104, 106. Example user devices 104, 106 may include a laptop, desktop computer, tablet, a smart television, a mobile computing device such as a smart phone, a portable digital assistant (PDA), a pager, a mobile television, a gaming device, a laptop computer, a camera, a video recorder, an audio/video player, radio, a global positioning system (GPS) device, or any combination of the aforementioned, or other portable device with processing and communication capabilities. In the illustrated example, the mobile device 106 is illustrated in FIG. 1 as having exemplary elements, the below descriptions of which apply as well to the computing device 104.

The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system used on personal computers, central computing systems, phones, and other devices.

The user 110 can be an individual, a group, or any entity in possession of or having access to the user device 104, 106, which may be personal, enterprise, or public items. Although the user 110 may be singly represented in some figures, in at least in some embodiments the user 110 is one of many such that a market or community of users, consumers, customers, business entities, government entities, clubs, and groups of any size are all within the scope of these descriptions.

The user device 104, 106, but as illustrated with reference to the mobile device 106, includes components such as, at least one of each of a processor 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user, or required or related to any or all of the applications or programs 130.

The memory device 122 is operatively coupled to the processor 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory additionally or alternatively can include an electrically erasable programmable read-only memory (EEPROM), flash memory or the like.

According to various embodiments, the memory device 122 and storage device 124 may be combined into a single storage medium. The memory device 122 and storage device 124 can store any of a number of applications that comprise computer-executable instructions and code executed by the processing device 120 to implement the functions of the user device 104, 106 described herein. For example, the memory device 122 may include such applications as a conventional web browser application and/or an enterprise-distributed application (e.g., a mobile application), collectively referred to herein as a "web portal". These applications also typically provide a graphical user interface (GUI) on the display 140 that allows the user 110 to communicate via the user device 104, 106 with, for example, an enterprise system 200, and/or other devices or systems. For instance, the GUI display screens may include features for displaying information and accepting inputs from users, such as fillable text boxes, data fields, hyperlinks, pull down menus, check boxes, and the like.

In one embodiment, when the user 110 decides to establishes an online account with an enterprise system 200, the user 110 may download or otherwise obtains a client application from the enterprise system 200, or from a distinct application server. In other embodiments, the user 110 interacts with the enterprise system 200 via a web browser application in addition to, or instead of, the downloadable client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

According to one embodiment, the input and output system 136 may include an optical instrument (e.g., camera 146) configured to detect presence of a scannable object within an image. For instance, the optical instrument may include one or more lenses and one or more image sensors (e.g., a charge coupled device (CCD) sensor) configured to convert photons into an electrical signal. For example, pixels of each the image sensors may each include a photodiode (e.g., a semiconductor) that becomes electrically charged in accordance with the strength of the light that strikes the photodiode, where the electrical charge is then relayed to be converted to an electrical signal. In one embodiment, a series of pulses may be applied to the one or more image sensors to relay the accumulate charges within each photodiode in succession down a row of photodiodes to an edge of the respective image sensor. Other optical instrument functionalities are also contemplated herein.

In some embodiments, a credentialed system is not required in order to access a web portal of the enterprise system 200, whereas in other embodiments authentication of a user may be necessary in order to provide access to a web portal. In one embodiment, the input and output system 136 may also be configured to obtain and process various forms of authentication to obtain authentication information of a user 110 in order to provide, for example, access to a specific web portal of the enterprise system 200. For instance, the web portal may be accessed based on the user providing authentication information to log in to the web portal in order to perform various functionalities described herein. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems. The user device, referring to either or both of the computing device 104 and the mobile device 106 may also include a positioning device 108, which can be for example a GPS configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., a system bus), connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which global system for mobile communication (GSM) voice calls, SMS text, enterprise messaging service (EMS), multimedia messaging service (MMS) messaging, time division multiple access (TDMA), code division multiple access (CDMA), personal digital cellular (PDC), wideband CDMA (WCDMA), CDMA2000, and general packet radio service (GPRS), are all non-limiting and non-exclusive examples. Thus, communications can be conducted, for example, via the wireless communication device 152, which can be or include a radio-frequency transceiver, a Bluetooth device, Wi-Fi device, a near-field communication device, and other transceivers. In addition, GPS may be included for navigation and location-related data exchanges, ingoing and/or outgoing. Communications may also or alternatively be conducted via the connector 154 for wired connections such as by USB, Ethernet, and other physically connected modes of data transfer. The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (TDMA), GSM, and/or IS-95 (CDMA), or with third-generation (3G) wireless communication protocols, such as Universal Mobile Telecommunications System (UMTS), CDMA2000, WCDMA and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and/or financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, loan officers, and/or referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The processing device 220 may perform functionalities of the disclosed systems and methods described herein. For instance, in one non-limiting example, the processing device 220 of the computing system 206 may be configured to provide access to a web portal of the enterprise system 200. Further, the processing device 220 may be configured to perform data processing to embed variable data and generate a scannable image comprising embedded variable data. Additionally, the processing device 220 may provide, via a network 258, the user device 104, 106 with access to the scannable image via the web portal.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS may be included for navigation and location-related data exchanges, ingoing and/or outgoing. Communications may also or alternatively be conducted via the connector 254 for wired connections such as by USB, Ethernet, and other physically connected modes of data transfer.

Furthermore, the computing device 206, may be or include a workstation, a server, or any other suitable device, including a set of servers, a cloud-based application or system, or any other suitable system, adapted to execute, for example any suitable operating system, including Linux®, UNIX®, Windows®, macOS®, iOS®, Android®, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated system 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent one or more external servers utilized by the enterprise system 200 in serving users 110. For instance, external systems 202, 204 may include an external server configured to initiate one or more server operations that include data processing. In particular, the data processing performed by the one or more server operations may include, at least in part, identifying an item (e.g., a promotional offer, a loan, a credit facility, an interest rate, etc.) available to a specific user 110 from one or more potential items (e.g., offers, promotions, sales, etc.). According to one non-limiting embodiment, the item that may be available to a specific user 110 may be based on a credit score or various other variables and may include subsidized financing terms (e.g., an interest rate, payment amount, total cost, etc.).

In another example, the external systems 202 and 204 represent a clearinghouse or rail systems for processing transactions. In yet another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

The enterprise system 200 can be configured to generate data manually or to obtain data from a third party source such as, for example, a cloud storage service or remote database. Such data that may be generated, downloaded, or otherwise obtained may include, for example, federal interest rates, user credit scores, credit reports, etc.

As described herein, user devices 104, 106 and an enterprise system 200 may be utilized in conjunction with data processing associated with populating at least a portion of a data submission form (e.g., a loan application) and with generating element data comprising an interactive element associated with an identified item.

For instance, according to one non-limiting embodiment, the user device 104, 106 may communicate, such as via wireless communication device 152, across a network, such as network 258, with the enterprise system 200. In response, the enterprise system 200 may provide, via the network 258 to the user device 104, 106, access to a web portal. In one example, the user 110 may provide authentication information (e.g., login information) in order to access the web portal. For instance, a dealership that sells certain types of equipment (e.g., construction equipment, manufacturing equipment, outdoor power equipment, trailers, all-terrain vehicles (ATVs), motorcycles, watercraft, etc.) may have a business account with an associated dealership number and in order to access the web portal the user 110 may need to be registered with that specific dealership number. Once the user 110 accesses the web portal, the user 110 may provide one or more additional inputs via fillable text boxes, data fields, hyperlinks, pull down menus, check boxes, etc. to generate a scannable image comprising variable data.

According to one non-limiting embodiment, a user (e.g., employee) at the dealership may be using the web portal to generate a hang tag to be printed and hung on a physical purchasable product being displayed in the showroom, where the hang tag will include a scannable image. Advantageously, by hanging the scannable image on the physical product that is on display in the showroom, a customer visiting the showroom that has access to a mobile device (e.g., a mobile phone) having an optical instrument (e.g., a camera) may scan, via the optical instrument, the scannable image to receive element data comprising an interactive element (e.g., a web link) that the user can select, via the mobile device, so that the customer can be directed to a digital data submission form (e.g., a loan application) that has at least a portion thereof (e.g., product information, dealership information, etc.) pre-populated with one or more variables (e.g., dealership information associated with a dealer account, product manufacturer, model type, sub type, model year, model number, etc.).

Figure 2:
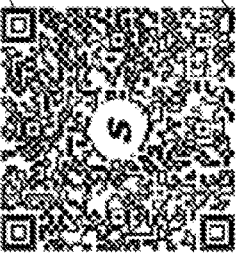
FIG. 2 depicts an example computing device comprising a user interface for providing one or more inputs through a web portal, in accordance with an embodiment of the present invention.

FIG. 2 depicts an example computing device 201 for providing one or more inputs through a web portal, in accordance with an embodiment of the present invention. In particular, the computing device 201 includes a user interface 203 (e.g., an electronic visual display, GUI, screen, etc.) configured to display the web portal (i.e., website) through which a user can generate a scannable image 205 (e.g., a quick response (QR) code) that includes a machine-readable matrix code with data modules embedded therein. In particular, the data modules may include variable data of one or more variables (e.g., dealership information associated with a dealer account, product manufacturer, model type, sub type, model year, model number, etc.) that are embedded within the machine-readable matrix code of the scannable image 205.

In one non-limiting example of a scannable image 205, a QR code may be used, which may include a matrix (two dimensional-2D) bar code that can be read by 2D image sensors such as scanners and digital cameras. Notably, a QR code provides a level of security as data transfer is not subject to being human readable or easily copied by end-users without use of a computing device. A scannable QR code image allows for storage of various kinds of data and other information. In one embodiment, the amount of data stored to the QR code may depend on the resolution or number of pixels included within the QR code image. A digital camera may be used to capture an image of the QR code and may include integrated software module(s) that are configured to read the encoded data within the QR code image. Unlike one-dimensional bar codes, the QR code design allows characters to be stored in a format where the data is not identified by a single set of vertical black strips, and instead black dots may be arranged in a square-shaped grid against a white background so that data can be stored in patterns along both the horizontal and vertical direction of the square. The QR code may feature three distinctive squares at three corners of the square-shaped QR code image with another image in the fourth corner of the square-shaped QR code image. Data stored in the QR code image may be read by an imaging device and then a processing device interprets the image. In particular, the imaging device may detect an encoding region and function patterns, where the function patterns comprise finder patterns of the three corners of the QR code image as well as timing patterns. Separators may separate each finder pattern of the three corners from the rest of the QR code patterns or symbols. The finder patterns may include blocks of black modules of a particular dimension (e.g., 3×3 pixels or blocks) that are surrounded by a square of border of white modules that is one module thick, which may in turn be surrounded by another square border of block modules that is one module thick.

Further, QR codes may use Reed-Solomon error correction over a finite field of elements that are encoded as bytes of 8 bits. The number of data versus error correction bytes within each block depends on the version (side length) of the QR symbol and the error correction level. In general, there are four error correction levels and the higher the error correction level then the less storage capacity of the data. In larger QR code images, there may be several Reed-Solomon code blocks, and the size of the block may be selected in order to reduce the amount of errors per block to limit the complexity of the decoding algorithm. In addition, the code blocks may be interleaved together to make it less likely that localized damage to the QR symbol will overwhelm the capacity of any single block. Masking may be used to break up patterns in the data encoded in the QR code that might confuse a scanner or imaging device.

Example QR codes that may be utilized as part of scannable image 205 may include, without limitation, (i) models 1 and 2 QR codes, (ii) micro QR code for applications where symbol size is limited, (iii) secure QR codes (SQR codes) that include a private data segment instead of specified filler bytes where the private data segment must be deciphered with an encryption key, (iv) just another barcode (JAB) codes that are color 2D matrices made of color squares arranged in either a square or rectangle grid, (v) frame QR codes having a canvas area that can be flexibly used where graphics, letters, and other information can be flexibly arranged thereby making it possible to lay out the code without losing the design of illustrations, photos, and the like, and (vi) high capacity colored 2D that may utilize colors for increasing data density.

According to one non-limiting embodiment, a user (e.g., employee) at the dealership may be using the web portal to generate a hang tag to be printed and hung on a physical purchasable product being displayed in the showroom, where the hang tag will include a scannable image. Advantageously, by hanging the scannable image on the physical product that is on display in the showroom, a customer visiting the showroom that has access to a mobile device (e.g., a mobile phone) having an optical instrument (e.g., a camera) may scan, via the optical instrument, the scannable image to receive element data comprising an interactive element (e.g., a web link) that the user can select, via the mobile device, so that the customer can directed a digital data submission form (e.g., a loan application) that has at least a portion thereof (e.g., product information, dealership information, etc.) pre-populated with one or more variables (e.g., dealership information associated with a dealer account, product manufacturer, model type, sub type, model year, model number, etc.).

In a non-limiting example, an employee at a dealership may wish to generate a hang tag that includes a QR code that consumers could scan to access a loan application. To produce the hang tag, the user may log in to the web portal and provide an input to "print" off a scannable image by selecting the functional "PRINT" button 209. The scannable image will automatically include variable data of a variable that is specific to the dealership whether or not the employee provides any additional variables (e.g., dealership information associated with a dealer account, product manufacturer, model type, sub type, model year, model number, etc.). Thus, the computing system may receive, based on a user providing one or more inputs (e.g., merely logging in to the dealership's account and/or selecting the functional "PRINT" button 209) both (i) a request to generate the scannable image (e.g., by way of concurrently generating a scannable image in real time in response to the user providing correct login information) and (ii) information indicating one or more variables (e.g., by way of the user providing login credentials associated with a specific dealership) that are used to populate at least a portion of the data submission form (e.g., a loan application).

In another non-limiting example, an employee at a dealership that is generating a hang tag with a QR code may cause a scannable image to be generated based on logging in to the dealership's web portal, the process of logging in (e.g., providing one or more inputs) thereby concurrently transmitting a request to generate a scannable image having dealership information (e.g., obtained based on logging in to the web portal using an account associated with the dealership) embedded therein as variables. The employee may then provide one or more additional inputs specific to the product or service to be embedded within the scannable image as part of the variable data. For instance, the web portal may display interactive pull down menus 207A–207E through which the user may provide one or more additional inputs. For instance, a first pull down option 207A may allow the employee to select a manufacturer (e.g., from a pre-determined drop down menu of optional manufacturers) of the purchasable product to be associated with the scannable image 205, a second pull down option 207B may allow the employee to select the model year (e.g., from a pre-determined drop down menu of optional years) that the purchasable product was manufactured, a third pull down option 207C may allow the employee to select a broad model type (e.g., from a pre-determined drop down menu of optional model types) such as ATV, trailer, motorcycle, etc., a fourth pull down option 207D to select additional model information (e.g., a model number, a model color, model trim option, engine size, etc.) and a fifth pull down option 207E to select a sub type (e.g., youth size, two-seat option, four-seat option, mid-size, full-size, etc.). Once the employee optionally makes any desired selections for the one or more additional inputs, the employee may select an "UPDATE" input 211 to update the scannable image 205 to embed the desired selections as variables within the variable data. If the employee decides to remove one or more of the variables or to modify the scannable image 205 with different selections, the user may select a "RESET" input 213 to reset some of the variables (e.g., the selected additional variables provided by the employee). According to one embodiment, selecting either the "UPDATE" or the "RESET" input 213 will still retain the dealership information variables embedded within the scannable image since the dealership information variables are associated with the dealer web portal being used to generate the scannable image 205.

According to various embodiments, a user may optionally provide inputs related to a layout of the hang tag itself that is to be printed. For instance, the user may select a "layout" input 215A, 215B to select the layout of the hang tag. For example, a "portrait" input 215A may select a portrait layout and a "landscape" input 215B may select a landscape layout for the hang tag. A user may also select a "pages" input 217A, 217B where the user may select a first input 217A to print only one hang tag per sheet of paper or a second input 217B to select two pages per sheet of paper. According to various embodiments, the web portal may also display a summary section 219 summarizing the selections currently embedded in a current version of the scannable image, thereby enabling the user to know whether the selections should be updated or reset based on additional or alternative selections. Additionally, based on selecting the "PRINT" button 209, the user may save the scannable image in a portable document format (PDF) or other digital format so that the user may email, text, or otherwise convey a digital version of the hang tag (including the scannable image) to another person and/or electronic device.

Referring back to FIG. 1, based on the user 110 providing information (e.g., authentication information) associated with the web portal (e.g., such as the web portal described with reference to FIG. 2), the processing device 220 of the enterprise system 200 may perform data processing on the information provided by the user. The data processing may include, in part, comparing the authentication information received to stored authentication information associated with multiple web portal accounts (e.g., web portal accounts of product retailers). If the authentication information (e.g., login credentials) that is received corresponds to an existing web portal account, the processing device 220 may concurrently generate a scannable image and embed variable data therein. In particular, the variable data may include entity information of the entity to which the corresponding web portal account is assigned. Additionally, the computing system 206 may distribute, via the web portal (e.g., across the network 258), the generated scannable image to the user device 104, 106. For instance, the scannable image may be displayed, via a graphical user interface of the user device 104, 106 on a landing page of the enterprise's web portal once the user 110 is authenticated and logs in. Advantageously, distributing the generated scannable image to the user device 104 may facilitate adding additional information associated with a purchasing product that can be embedded within the variable data of the scannable image. Further, according to various embodiments, distributing the generated scannable image may also facilitate emailing, texting, or printing of the scannable image to a consumer, digital scanning of the scannable image. In response to the scannable image being digitally scanned, the data submission form that is at least partially populated with one or more variables may be displayed, via a digital electronic display.

In a non-limiting example, if an employee of an enterprise (e.g., a retailer) provides authentication information in order to log in to an enterprise's web portal account, the processing device would perform data processing to verify that the authentication information provided does, in fact, correspond to stored authentication information associated with the enterprise's web portal account. If the authentication information correctly corresponds to stored authentication information associated with the enterprise's web portal account, the employee would not only be granted access to the enterprise's web portal account, but a scannable image is generated, where generation of the scannable image (e.g., QR code) includes embedding variable data within the scannable image. In particular, the variable data that is embedded in the scannable image includes one or more variables that include the entity information of the enterprise (e.g., retailer information) to which the web portal account is assigned (i.e., the enterprise to which the web portal account is assigned) or with which the web portal account is associated. In addition to the variable data, a hyperlink may also be embedded within the scannable image in order to direct a user that scans the scannable image to a website to access the data submission form. Further, once the processing device generates the scannable image with the embedded variable data, and concurrently with providing the employee with access to the enterprise's web portal, the scannable image is distributed/displayed, via the web portal, on a graphical user interface of the user device. The scannable image may also be displayed, via the graphical user interface, alongside various drop down menu options where the employee can select additional information to be embedded within the scannable image. For instance, the employee may provide one or more additional inputs through the web portal by selecting certain characteristics about a purchasable product from one or more drop down menu options. Once the employee provides these additional inputs related to the characteristics about the purchasable product, the employee may select an input to update the scannable image to embed one or more additional variables within the variable data of the scannable image. Once the employee has determined that sufficient information is embedded within the scannable image, the employee may print, email, text, or otherwise utilize the scannable image (e.g., hang the scannable image on a purchasable product). When that scannable image gets scanned, then a representation of an interactive element (e.g., a link) may appear on the graphical user interface of the device that scans the scannable image, and selection of that interactive element may cause a data submission form that is at least partially populated with variables (e.g., retailer information, product information, etc.) that the employee determined should be embedded within the scannable image.

FIG. 3 depicts an example hang tag 300 that includes a scannable image 305 comprising variable data embedded therein, in accordance with an embodiment of the present invention. The hang tag 300 may be generated based on a user selecting a "PRINT" button (such as "Print" button 209 of FIG. 2) to print a hang tag that includes the scannable image 305. The hang tag 300 may also textually indicate the one or more variables and/or one or more additional variables that were selected by the user to be embedded, and that are embedded, within the scannable image 305. For instance, the hang tag 300 lists several additional variables that are embedded within the scannable image 305 including a name of a manufacturer 351, model information 353, sub type information 355, year of manufacture information 357, and model number information 359.

When a customer/user digitally scans the scannable image 305 using an optical instrument of a mobile electronic device, a representation of an interactive element (e.g., a web link) may be displayed via a graphical user interface of the mobile electronic device. When a user selects the interactive element, a digital data submission form that is at least partially populated with one or more variables (e.g., retailer information) and/or one or more additional variables (e.g., manufacturer, purchasable product information, etc.).

Referring back to FIG. 1, a user 110 may utilize the input and an optical instrument (i.e., camera 146) of the user device 104, 106 to detect, via the optical instrument, presence of a scannable object (e.g., the scannable image 305 from FIG. 3) that includes computer readable matrix code within an image that includes several objects located within view of the optical instrument. For instance, the user 110 may hold up the user device 104, 106 so that the camera 146 shows some or all of a hang tag (e.g., such as hang tag 300 from FIG. 3) and/or additional objects (e.g., such as background objects within the field of view of the camera 146). In particular, the optical instrument may define a bounding region encompassing the scannable object in order to differentiate the scannable object from other objects within the image.

According to one embodiment, and with continued reference to FIG. 1, the processor 120 of the user device 106 may contemporaneously perform, via an image analysis system of the user device 106 image analysis that includes pattern recognition on the readable matrix code of the scannable object (e.g., the scannable image 305 from FIG. 3), and based thereon decipher the readable matrix code to identify data modules embedded within the scannable object. In particular, the data modules include encoded data that include one or more embedded variables.

According to one embodiment, the user device 106 may digitally display, via a user interface (e.g., display 140) of the user device 106 a representation (e.g., a popup) of an interactive element (e.g., a web link) that the user 110 can select via a user interface (e.g., display 140) of the user device 106. Based on the user selecting the interactive element, the user interface (e.g., display 140) of the user device 106 may display a digital data submission form that is at least partially populated with one or more variables (e.g., associated with an enterprise/retailer) and/or one or more additional variables (e.g., associated with a purchasable product).

According to another embodiment, the user device 106 may then transmit, via the network 258 and based on detecting the data modules from the scannable object (e.g., the scannable image 305 from FIG. 3), the encoded data comprising the one or more embedded variables to an external server (e.g., computing device 206, external system 202, or external system 204) to initiate one or more server operations that include data processing. In particular, the data processing performed by the one or more server operations may include, at least in part, identifying, based on the one or more embedded variables included in the encoded data, an item (e.g., offer, promotion, sale, etc.) that would be available to the user from one or more stored potential items. Further, the data processing may also generate element data that includes an interactive element (e.g., a web link) associated with the identified item (e.g., offer, promotion, sale, etc.). The user device 106 may then receive, via the external server (e.g., computing device 206, external system 202, or external system 204) the element data (e.g., a web link) that includes the interactive element associated with the identified item (e.g., offer, promotion, sale, etc.). The user device 106 may digitally display, via a user interface (e.g., display 140) of the user device 106 a representation (e.g., a popup) of the interactive element associated with the identified item.

Referring back to FIG. 3, according to various embodiments, the one or more stored potential items that may be available to the user upon scanning the scannable image 305, may be provided by one or more entities that may offer one or more subsidies to reduce the purchase price, financing price, term length, and/or other terms associated with the purchase of the purchasable product identified by the one or more variables (e.g., 351, 353, 355, 357, 359) upon which the hang tag 300 is associated. For instance, the seller, a distributor, a manufacturer 351, independent organizations, and/or government or other regulatory bodies may provide a subsidy associated with the purchasable product.

Figure 4:
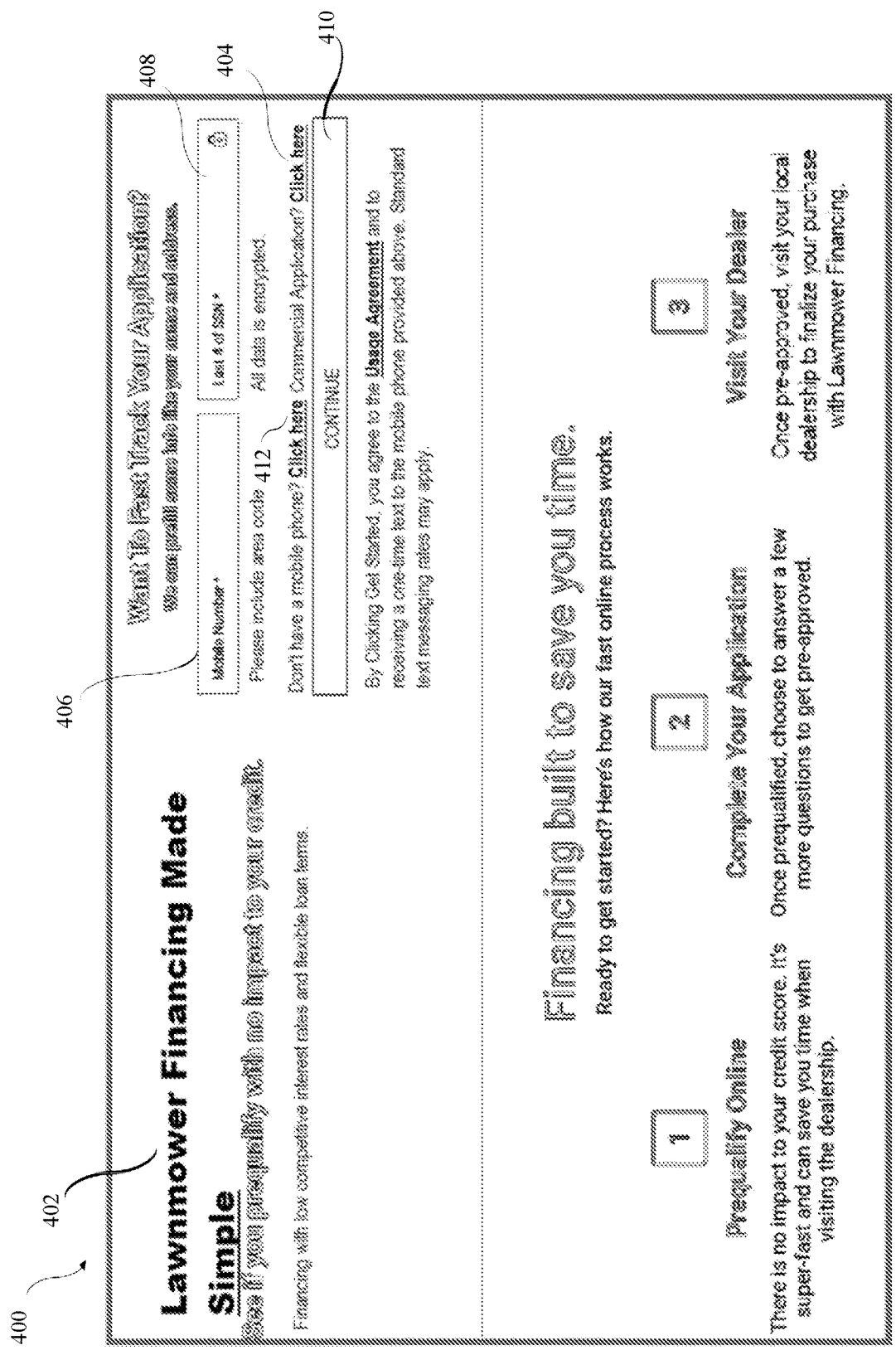
FIG. 4 depicts an example landing page accessible based on scanning a generated scannable image, in accordance with an embodiment of the present invention.

FIG. 4 depicts a non-limiting example digital landing page 400 accessible based on scanning a generated scannable image (e.g., such as scannable image 305 from FIG. 3), in accordance with an embodiment of the present invention. The particular purchasable product 402 that would have been associated with the scannable image in this example shown by FIG. 4 is a lawnmower, but the same principle applies for any purchasable product. Once a user scans a scannable image/object and an interactive element is displayed via the user's computing device, the user may select the interactive element and be directed to the digital landing page 400. At the digital landing page 400, the user has the option to either select a commercial application icon 404 to directly access a digital data submission form or provide personally identifiable information via fillable text boxes, data fields, hyperlinks, pull down menus, check boxes, etc. to prefill some information prior to accessing the digital data submission form. For instance, the user has the option to provide a mobile number via a text box 406 and the last four digits of the user's social security number via another text box 408. The information provided by the user via text box 406 and text box 408 would be encrypted as a security measure to protect the user's personally identifiable information. Upon providing the personally identifiable information, the user may select a "CONTINUE" button 410, thereby agreeing to a "usage agreement" and agreeing to receive a one-time text to the mobile phone number provided. If the user does not have a mobile phone in order to receive text messages, the user may select an icon 412 that indicates the user does not have a mobile phone in order to provide directly access the digital data submission form.

FIG. 5A depicts a first portion of an example data submission form 500, in accordance with an embodiment of the present invention. The variables that were selected to be embedded within the variable data of the scannable image will determine what information is pre-populated on the example data submission form 500. In this particular example, the only variables that would necessarily be embedded within the variable data of the scannable image would be one or more variables associated with the enterprise to which the web portal account that generated the scannable image is assigned, in which case, as depicted, the name of the enterprise (e.g., "Product Retailer A") is displayed, thereby at least partially populating the digital data submission form 500 with one or more variables 502. In this particular example shown by data submission form 500, no additional variables (i.e., beyond the one or more variables associated with the enterprise) specifically related to the purchasable product were selected to be embedded within the variable data. For those variables that are not populated prior to the user accessing the digital data submission form 500, the user may provide one or more inputs via fillable text boxes (e.g., providing text variables), data fields, hyperlinks, pull down menus, check boxes, etc.

According to various embodiments, although not depicted in this particular example digital data submission form 500, information about the product itself may also be populated if such information is embedded within the variable data of the scannable image. If such product information is not embedded within the scannable image, then the user may provide the product information via the digital data submission form 500. For instance, the user may select a manufacturer (e.g., from a pre-determined drop down menu of optional manufacturers 504) of the purchasable product. Additionally, the user may select a model type (e.g., from a pre-determined drop down menu of optional product models 506), as well as a sub type of the model (e.g., from a pre-determined drop down menu of optional model sub types 508). If the user has additional information specific to the particular model (e.g., model year, model number, model color, etc.) then the user may select check box 510 and additional drop down menus may appear that would enable the user to provide the information that is specific to the particular model. Further, the digital data submission form 500 may include various selectable options 512A, 512B, 512C to allow the user to indicate whether the loan application to purchase the product is for consumer/personal/household use (e.g., selectable option 512A), commercial/business use (e.g., selectable option 512B), or if the loan is in the name of a business (e.g., selectable option 512C). The user may also use text box 514 to indicate the total amount that is to be financed.

The digital data submission form 500 may also include various inputs 516 (e.g., fillable text boxes, data fields, hyperlinks, pull down menus, check boxes, etc.) for the user to provide personally identifiable information (e.g., social security number, name, address, date of birth, etc.) about the primary applicant FIG. 5B depicts a second portion of the example data submission form 500 of FIG. 5B, in accordance with an embodiment of the present invention. If the mailing address is different from the primary applicant's address then the user may provide mailing address information via inputs 518. The user may also provide additional personally identifiable information that may be needed to determine the type of financing product for which the user may qualify. For instance, the user may provide additional inputs 520 indicating a residence status, number of years at residence, monthly housing/rent payment, an email address, home phone number, mobile phone number, etc. The user may also provide employer information via inputs 522. For instance, the user may indicate an employment status, monthly gross income, name of current employer, current employer city, years of employment, and a work phone number. The user may also provide nearest relative information via inputs 524 including, for example, nearest relative name, nearest relative city, nearest relative state, nearest relative phone number. Once the user has provided the requested information, the user may select a check box 526 indicating that they have read and acknowledge certain information and may then select an icon 530 (e.g., "next" icon) to take the next step in the application process. Alternatively, the user may reset the information provided via the data submission form 500 by selecting a "reset" icon 528.

Advantageously, the systems and methods disclosed herein provide product retailers (e.g., dealerships) with the ability to create QR codes that link to a pre-qualification loan application that is at least partially populated with information such as, for example, information about the product retailer to provide the financial entity that would issue the loan with information that would be necessary to know in order to provide the financing to the loan applicant. In particular, the QR code would have embedded information about the product retailer within the QR code that is generated by virtue of the QR code being generated when a user logs in to an account associated with the product retailer in order to generate the QR code. Thus, the QR code that is generated via the product retailer's account is automatically attached to the product retailer, and then the product retailer can embed additional information within the QR code so that separate QR codes can be generated for specific purchasable products. When a customer scans the QR code to access a loan application, the loan application is automatically prefilled with the information that was embedded within the QR code. This functionality would be advantageous within retail locations (e.g., stores) as well as product shows and various other locations. Once the loan application is submitted and the customer agrees to share the data with the financial entity that would issue the loan, the loan application may is transferred to the product retailer's online portal, where the product retailer can finalize the sale information for submission to the financial entity to determine credit worthiness and relevant financing options that can be offered to the client.

According to various embodiments, the QR codes can be created by the individual product retailers for products that have not yet arrived at a retail location or that have not yet been shipped to the retail location. In other instances, the product retailer may receive a shipment of units and as the units arrive, the product retailer can create QR codes (e.g., hang tags) for each product. In particular, the product retail may hang tags displaying the QR codes on the physical products that are located at the retail location. This may be advantageous for large or expensive products (e.g., vehicles, construction equipment, manufacturing equipment, outdoor power equipment, trailers, all-terrain vehicles (ATVs), motorcycles, watercraft, etc.) where financing may be needed to purchase the product. The loan application is easily accessible and depending on how much information is pre-selected and embedded within the QR code, the product retailer information as well as much of the product information may be already populated in the loan application, which would help the financing entity connect the loan application with the appropriate product retailer and product. Advantageously, if specific model information is provided, the financing entity can access the manufacturer's suggested retail price (MSRP) so that the financing entity would know the exact cost of the product that the consumer would need to pay in order to purchase the product. Another advantage is that customers do not have to manually input as much information as part of the loan application.

According to various embodiments, when the customer scans the QR code and an interactive element (e.g., a link) is digitally displayed via the user device, the landing page where the user is directed based on selecting the interactive element may be associated with an item (e.g., offer, promotion, sale, etc.) that would be available to the customer. In particular, if the product retailer that generated the QR code embedded information about a product into the QR code, then the landing page may indicate that a promotion is available for that product based on identifying an item (e.g., offer, promotion, sale, etc.) associated with that product from one or more potential items that are currently being offered. For instance, the manufacturer may be offering a promotion for products purchased in a geographic region where the product retailer is located, so when the user scans the scannable image/object, an external server associated with the manufacturer may perform server operations that include identifying from stored potential items (e.g., offers, promotions, sales, etc.) whether an item (e.g., a promotion) is available to the customer. If an item is available to the customer, the landing page to which the user is directed, based on the scannable image having a hyperlink embedded therein that directs the user to the landing page to access financing, will display the promotion that is available to the customer.

It is contemplated herein that a computing system may generate one or more scannable images or URLs that include one or more embedded variables, where the one or more embedded variables may be used to prefill a digital submission form (e.g., a user form, a credit application, etc.) with various variables (e.g., business location information, collateral-products/services, and/or financing information such as rates, terms, etc.). It is also contemplated, that scannable images and/or URLs generated by the system can operate completely automated from server instructions to embed one or more variables (e.g., based on geolocation of a retail location or various other detectable or derivable information) without requiring user input. In other embodiments, the user may input or otherwise select various variables to be embedded within the scannable images and/or URLs.

In addition, it is also contemplated that scanning a scannable image having one or more variables embedded therein may return financing information to the end user that scans the scannable image, where the financing information includes, for example, rates, terms, disclaimers, etc. In some embodiments, relevant financing information may be returned by various digital methods (e.g., a webpage, a SMS text message, an email message, etc.). In some embodiments, the scannable image may already include one or more embedded variables that can be used to automatically pre-populate a digital submission form with various information such as, for example, business location information, collateral (e.g. product/service) information, and/or financing information.

In some embodiments, when a user provides a user input to generate a scannable image or URL, the user may provide the user input prior to providing authorization information to access an account (e.g., prior to accessing a credential system) via a publicly accessible web page. In other embodiments, the user may provide inputs after obtaining access to a user account (e.g., behind a credential system) of a web portal.

In some embodiments, an end user may provide various inputs into a digital submission form by providing text inputs via a chatbot or text box in order to populate portions of a partially prepopulated digital submission form. In some embodiments, a user may pre-populate a digital submission form by providing information by providing prompts via a chatbot, a text instruction, or various other inputs provided to a computing system to generate a scannable image and/or URL.

In some embodiments, scanning a scannable image may transmit a communication to a web server to process one or more variables embedded within a scannable image to prefill a digital submission form with various information such as, for example, product/service information and/or financing information (e.g., rates, terms, disclaimers, etc.).

Figure 6:
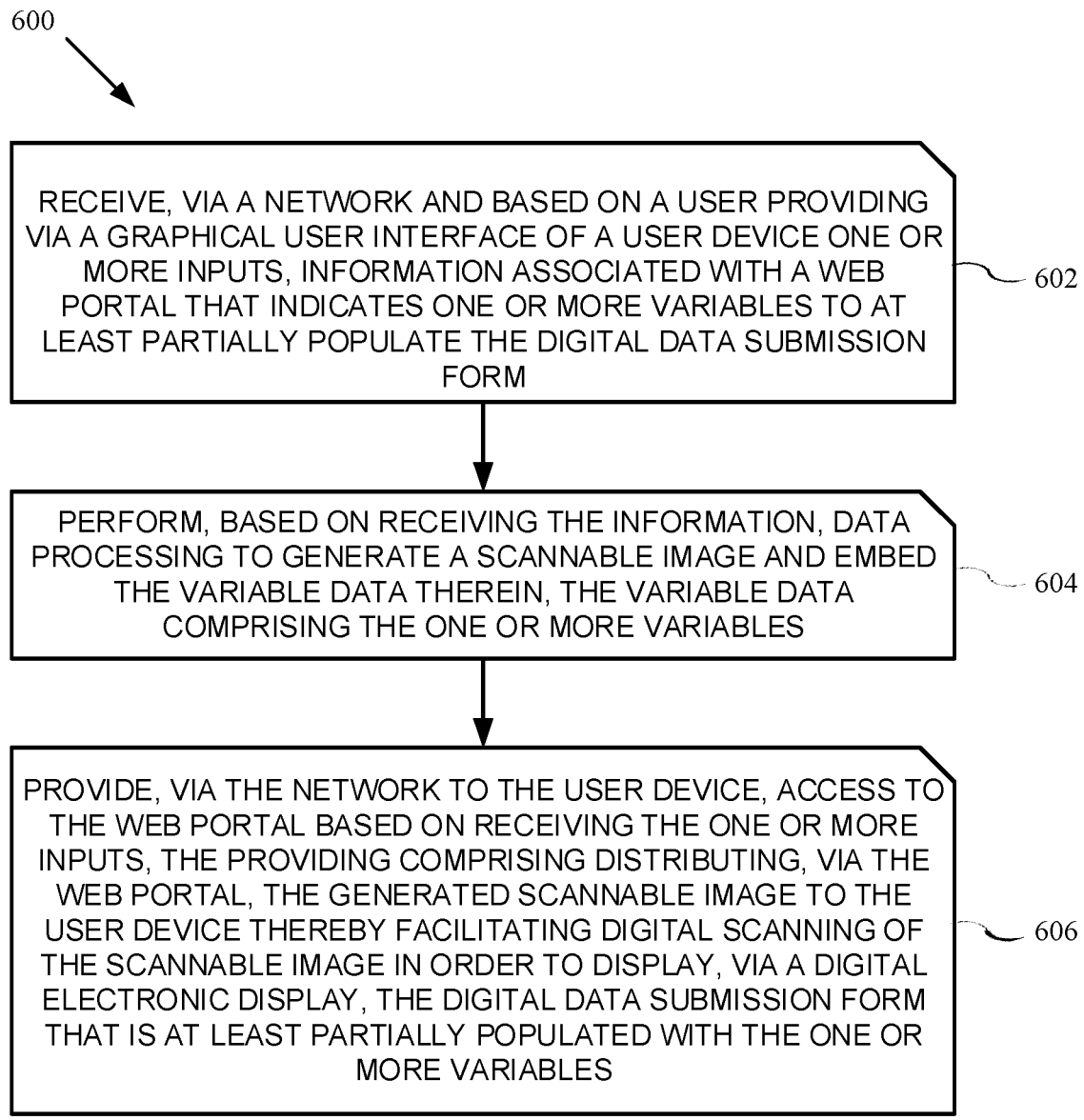
FIG. 6 depicts a block diagram of an example method for data processing to at least partially populate a digital data submission form, in accordance with an embodiment of the present invention.

FIG. 6 depicts a block diagram of an example method 600 for data processing to at least partially populate a digital data submission form, in accordance with an embodiment of the present invention. At block 602, information (e.g., authentication information, a website domain, IP address, etc.) that indicates one or more variables (e.g., an enterprise information linked to the authentication information) associated with a web portal (e.g., a web portal account of the enterprise that is accessible via the web portal) is received via a network and based on a user providing, via a graphical user interface (e.g., a display screen) of a user device, one or more inputs (e.g., a fingerprint, a temporal pattern of inputs, email authentication, username, password, code, etc.). In particular, the information received indicates one or more variables (e.g., enterprise information) that are to at least partially populate the digital data submission form (e.g., an online loan application). According to one embodiment, the information includes authentication information associated with a web portal account that is accessible via the web portal, and where the one or more variables embedded within the variable data include retailer information of a product retailer (e.g., a distributor) to which the web portal account is assigned. For example, the user may provide login information in order to access an enterprise account associated with the web portal, where the login information is linked to the enterprise account and thereby indicates enterprise information that is received and is to be used to at least partially populate the digital data submission form (e.g., an online loan application).

At block 604, based on receiving the information, data processing is performed to generate a scannable image and embed variable data therein, where the variable data includes the one or more variables indicated by the information received. According to one embodiment, based on the information received including authentication information associated with a web portal account that is accessible via the web portal, the data processing may further include authenticating the user based on the information received to determine whether the authentication information corresponds to an existing web portal account. Further, according to one embodiment, the scannable image that is generated includes readable matrix code and the variable data is embedded within the scannable image as data modules.

At block 606, access to the web portal is provided, via the network to the user device, based on receiving the one or more inputs. In particular, providing the access includes distributing, via the web portal, the generated scannable image to the user device, thereby facilitating digital scanning of the scannable image in order to display, via a digital electronic display, the digital data submission form that is at least partially populated with the one or more variables. Additionally, according to one embodiment, when the data processing includes authenticating a user, the access may only be provided if the user is successfully authenticated.

According to various embodiments, the method 600 further includes receiving, based on the user providing one or more additional inputs through the web portal, additional information indicating one or more additional variables to populate a portion of the digital data submission form not previously populated by the one or more variables. According to one embodiment, the one or more additional inputs include a request to update the variable data embedded within the scannable image with the one or more additional variables. In addition, according to various embodiments, the one or more additional variables comprise product information associated with a purchasable product. The method 600 may also include performing, based on receiving the additional information, additional data processing to embed the one or more additional variables within the variable data. According to one embodiment, the method 600 may also include receiving a reset request, through the web portal, to reset the one or more additional variables received, and in response to receiving the reset request, resetting the variable data to remove the one or more additional variables embedded within the variable data while retaining the one or more variables embedded within the variable data. For example, according to a non-limiting embodiment, the enterprise information may be retained since that enterprise associated with the scannable image that was generated would be linked to the enterprise account associated with the web portal, whereas product information could be reset since the user may incorrectly input certain product information or may determine that the scannable image should be associated with a different product. The method 600 may also include producing, based on distributing the generated scannable image to the user device, a visual representation of the one or more additional variables currently embedded within the embedded variable data, wherein producing the visual representation facilitates displaying the produced visual representation via the graphical user interface of the user device. In a particular embodiment, various restrictions may be applied that multiple variables (e.g., at least three variables) must be selected in order to embed the one or more additional variables within the variable data.

Figure 7:
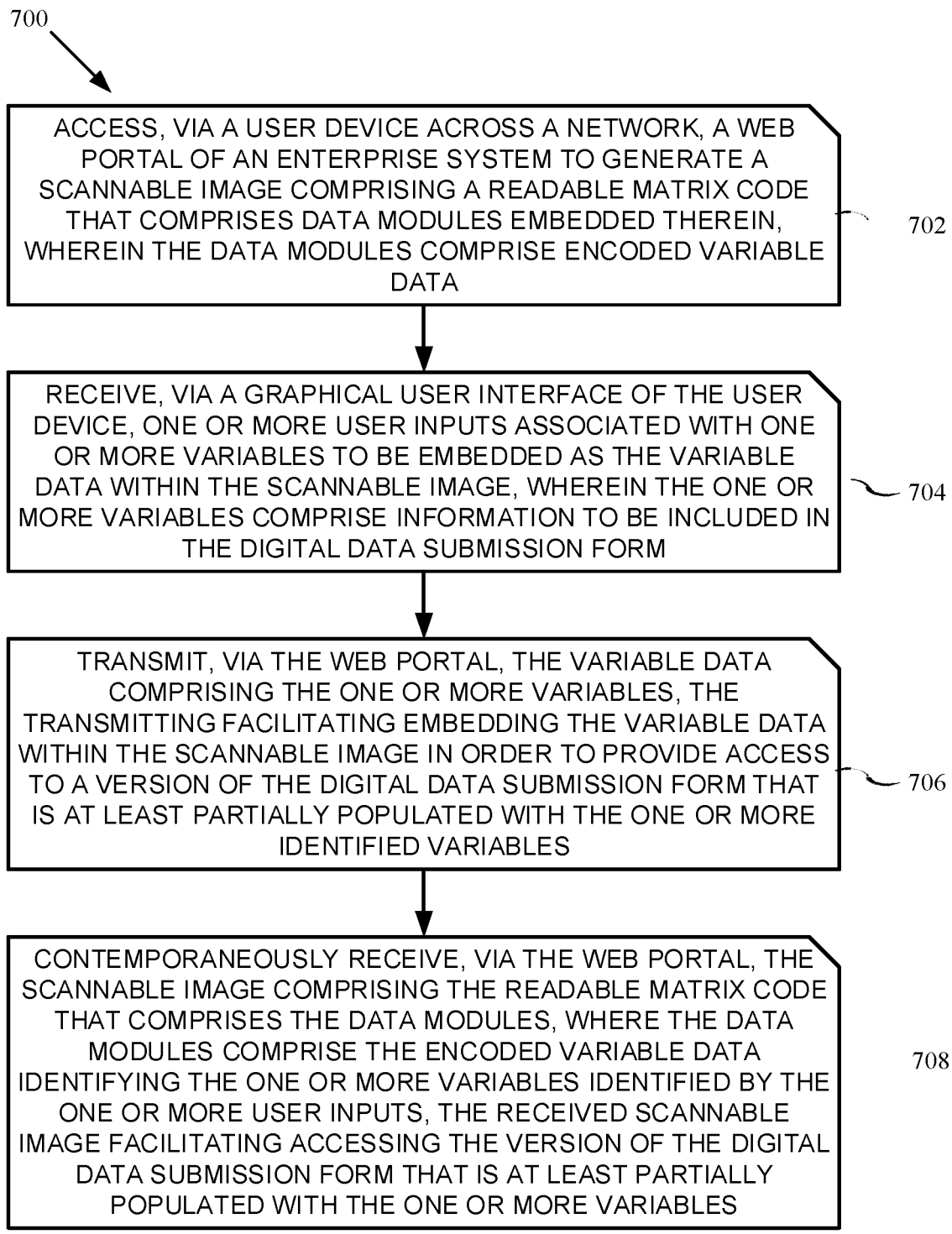
FIG. 7 depicts a block diagram of an example method for data processing to at least partially populate a digital data submission form, in accordance with an embodiment of the present invention.

FIG. 7 depicts a block diagram of an example method 700 for data processing to at least partially populate a digital data submission form, in accordance with an embodiment of the present invention. At block 702, a user device may be used (e.g., by a user or any individual whether or not directly associated with or employed by a business establishment or the enterprise) to access (e.g., either in front of a credential system via the open web by providing, for example, a website domain name/IP address or behind a credential system after providing login credentials), across a network, a web portal of an enterprise system (e.g., a system of a business/company, financial institution, loan servicer, retail establishment, etc.) to generate a scannable image comprising a readable matrix code that comprises data modules embedded therein, wherein the data modules comprise encoded variable data. According to one embodiment, the web portal of the enterprise system may be accessed, via the user device, based on the enterprise system authenticating a user of the user device. For instance, the authenticating may include determining whether authentication information (e.g., a fingerprint, a temporal pattern of inputs, speech, biometric information, a fingerprint, email authentication, username, password, code, etc.) provided, via the user device by the user, corresponds to an existing web portal account. In another embodiment, no authentication process is needed, and merely accessing the web portal triggers generation of the scannable image in a manner that is completely automated from server instructions absent any user input. According to one embodiment, the data modules may also include an embedded hyperlink for accessing a version of the digital data submission form that is at least partially populated with the one or more variables.

At block 704, one or more user inputs associated with one or more variables to be embedded as the variable data within the scannable image are received via the user device. In particular, the one or more variables include information to be included in a version of the digital data submission form. According to one embodiment, the information to be included in the version of the digital data submission form may include entity information (e.g., retailer information) associated with a product retailer.

At block 706, the variable data that includes the one or more variables is transmitted, via the web portal, where the transmitting facilitates embedding the variable data within the scannable image in order to provide access to the version of the digital data submission form that is at least partially populated with the one or more variables. For instance, the variable data may be transmitted to an external computing device of an enterprise system in order for a processing device of the enterprise system to embed the variable data within the scannable image such that scanning the scannable image may facilitate accessing the version of the digital data submission form that is at least partially populated with the one or more variables.

At block 708, the scannable image that includes the readable matrix code that includes the data modules is contemporaneously received via the web portal. In particular, the data modules may include the encoded variable data that identifies the one or more variables associated with the one or more user inputs. Further, the scannable image that is received facilitates access to the digital data submission form that is at least partially populated with the one or more variables.

The method 700 may also include, according to one embodiment, displaying, via a graphical user interface of the user device, the scannable image comprising the readable matrix code. According to various embodiments, the method 700 may also include receiving, based on the user providing one or more additional inputs through the web portal, additional information indicating one or more additional variables to populate a portion of the digital data submission form not previously populated by the one or more variables to further be embedded in the variable data. Additionally, according to one embodiment, the variable data transmitted includes the additional information indicating the one or more additional variables such that when data processing is performed to embed the one or more additional variables within the variable data another version of the digital data submission form is created. Further, the data modules of the readable matrix code include the encoded variable data that further identifies the one or more additional variables and the received scannable image facilitates accessing another version of the digital data submission form that is at least partially populated with both the one or more variables and the one or more additional variables. In one example, the additional information may also include product information associated with a product that is purchasable via an entity/retailer associated with the information to be included in the version of the digital data submission form.

According to one embodiment, concurrently with receiving the scannable image, the method 700 also includes receiving a visual representation of the one or more additional variables currently embedded within the embedded variable data. Additionally, the method may also include, according to one embodiment, displaying the produced visual representation via a graphical user interface of the user device.

Figure 8:
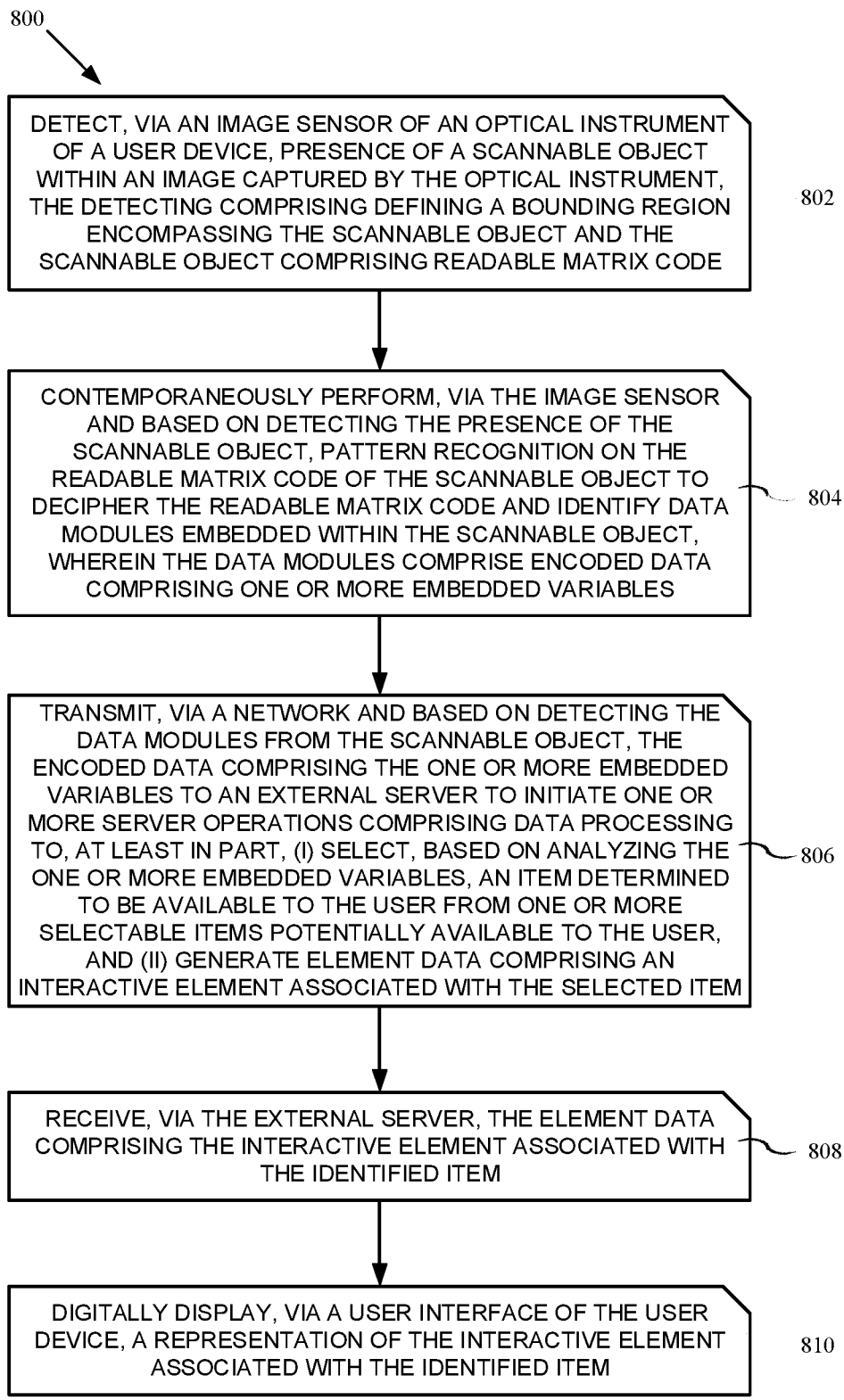
FIG. 8 depicts a block diagram of an example method for deciphering matrix code via an image sensor for embedded variable identification, in accordance with an embodiment of the present invention.

FIG. 8 depicts a block diagram of an example method 800 for deciphering matrix code via an image sensor for embedded variable identification, in accordance with an embodiment of the present invention. At block 802, an image sensor of an optical instrument of a user device is used to detect presence of a scannable object (e.g., a QR code) within an image captured by the optical instrument, where the detecting includes defining a bounding region encompassing the scannable object and the scannable object includes readable matrix code. According to one embodiment, the optical instrument may further include one or more lenses and the image sensor is configured to convert photons that pass through the one or more lenses into an electrical signal. Additionally, according to one embodiment, the readable matrix code may include two-dimensional code encoding encoded data that includes one or more embedded variables. According to one embodiment, the scannable object is associated with a purchasable product or service.

At block 804, based on detecting the presence of the scannable object, the image sensor of the optical instrument of the user device is used to contemporaneously perform pattern recognition on the readable matrix code of the scannable object to decipher the readable matrix code an identify data modules embedded within the scannable object, where the data modules include encoded data that include one or more embedded variables.

At block 806, the user device transmits, via a network and based on detecting the data modules from the scannable object, the encoded data comprising the one or more embedded variables to an external server to initiate one or more server operations comprising data processing to, at least in part, (i) select, based on analyzing the one or more embedded variables, an item (or multiple items) determined to be available to the user from one or more selectable items potentially available to the user, and (ii) generate element data comprising an interactive element (e.g., a link, a hyperlink, etc.) associated with the selected item. According to one embodiment, the interactive element includes a link to a digital landing page configured to display the selected item and, according to one embodiment, the selected item includes a marketing incentive associated with a product or service. For instance, in one example, the marketing incentive may be selected from the group consisting of a promotion, an offer, a sale, an interest rate, and a discount. In one embodiment, the interactive element may be associated with a digital application (e.g., a loan application to prequalify for a loan) to obtain financing (e.g., a loan) to purchase the product or service. Additionally, in one example, the marketing incentive may be associated with the financing. For instance, the marketing incentive may provide lower processing fees, a lower interest rate, a tiered interest rate where the interest rate is lower for a period of time, etc.

At block 808, the element data comprising the interactive element associated with the identified item are received via the external server, and at block 810, a representation of the interactive element associated with the identified item is digitally displayed via a user interface of the user device. For instance, the representation may appear superimposed alongside the scannable object within the image captured by the optical instrument.

According to various embodiments, the method 800 may further include displaying, based on the user selecting the representation of the interactive element associated with the selected item, a digital landing page configured to provide access to a digital data submission form. The method 800 may also include, according to various embodiments, accessing, based on receiving one or more user inputs, the digital data submission form, where the digital data submission form is at least partially populated with one or more variables. The method 800 may also include receiving personally identifiable information associated with the user to populate a portion of the digital data submission form not previously populated with the one or more variables. Further, the method 800 may also include transmitting the digital data submission form that includes the portion populated with the personally identifiable information to an enterprise system for processing to determine, for example, whether to provide the user with financing to purchase a purchasable product or service. According to one embodiment, the enterprise system may include the external server.

According to various embodiments, the interactive element may include a link to a digital landing page through which the user may provide communication information in order to obtain relevant financing information, wherein the communication information includes a phone number or an email address. Further, the user may indicate a communication preference (e.g., SMS text message, email, phone call, etc.) simultaneously with providing the communication information. In some embodiments, the interactive element may include a link to a digital landing page comprising a partially populated digital data submission form, where the partially populated digital data submission form includes information selected from the group consisting of a business location, product information, and financing information.

Figure 9:
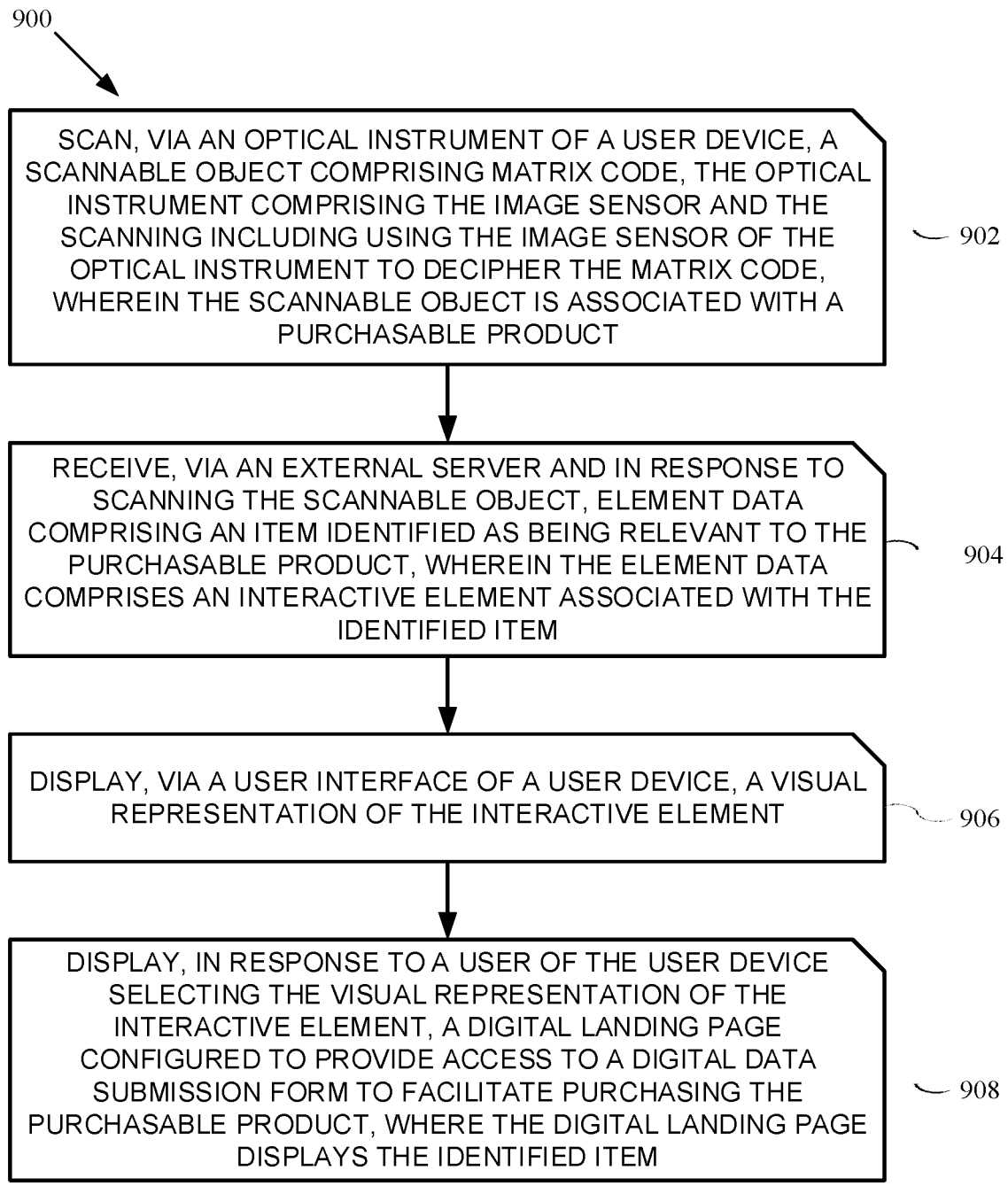
FIG. 9 depicts a block diagram of an example method for deciphering matrix code via an image sensor for embedded variable identification, in accordance with an embodiment of the present invention.

FIG. 9 depicts a block diagram of an example method 900 for deciphering matrix code via an image sensor for embedded variable identification, in accordance with an embodiment of the present invention. At block 902, a scannable object comprising matrix code is scanned via an optical instrument of a user device, where the optical instrument includes the image sensor and the scanning includes using the image sensor of the optical instrument to decipher the matrix code, and where the scannable object is associated with a purchasable product or service. According to one embodiment, the optical instrument comprises one or more lenses, and the image sensor is configured to convert photons that pass through the one or more lenses into an electrical signal.

At block 904, in response to scanning the scannable object, element data comprising an item (or multiple items) identified as being relevant to the purchasable product or service is received via an external server, where the element data includes an interactive element associated with the identified item. According to one embodiment, the identified item includes a marketing incentive for purchasing the purchasable product or service. According to one embodiment, the interactive element includes a link to a digital landing page. Further, according to one embodiment, the item identified as being relevant to the purchasable product or service is selected from a plurality of items having differing values, and where the item is identified based on comparing the plurality of items and determining that the identified item provides a relatively highest value to the user. For instance, there may be multiple items/promotions that are available based on the time of year, the product or service being purchased, the geographic region in which the purchase is to be made, or various other considerations that could influence the price, financing terms, or other elements associated with the purchasable product or service. In order to identify which item to display to the user that, theoretically, would provide the greatest incentive to the user to purchase the product or service, the computing system may compare the plurality of items and determine that the item identified to be included in the element data provides a relatively higher value to the user than any of the other items/promotions. In particular, according to one embodiment, the process of determining that the identified item provides the relatively highest value to the user may be based, at least in part, on determining that the purchasable product or service satisfies one or more criteria to qualify for the identified item. For instance, the one or more criteria may include an eligibility time period (e.g., a week, a month, a quarter, a year etc.) within which the identified item is available. Further, the process of determining that purchasing the purchasable product or service satisfies the one or more criteria to qualify for the identified item may be based, at least in part, on determining that a current time period is within the eligibility time period, where the current time period includes a time when the scannable object is scanned. For example, if the user scans the scannable object, in order to determine whether to embed the identified item in the element data the system may determine whether purchasing the item at a current time, the current time being the time at which the scannable object is scanned, would satisfy a criteria related to an eligibility time period. For instance, some promotions or sales may only be active for a limited time, and in order to identify the item to be embedded within the element data the system may need to determine that the moment at which the user scans the scannable object is within the limited time period in which the promotion applies. According to one embodiment, the processing of determining that purchasing the purchasable product or service satisfies the one or more criteria to qualify for the identified item is based, at least in part, on embedded data embedded within the scannable object. For example, the scannable object may have embedded data embedded therein that provides information about the retailer from which the product or service is being purchased or may provide information about the product or service itself (e.g., a make, a model, a year, etc.) that may influence which item/promotion could apply. For instance, the promotion may only be relevant to products made by a specific manufacturer, in which case if the scannable object includes information about the specific manufacturer of the product embedded within the embedded data then the system can determine that purchasing the purchasable product would satisfy the criteria for that specific manufacturer promotion.

At block 906, a visual representation of the interactive element is displayed, via a user interface of a user device. At block 908, in response to a user of the user device selecting the visual representation of the interactive element, a digital landing page that is configured to provide access to a digital data submission form to facilitate purchasing the purchasable product or service is displayed, where the digital landing page displays the identified item.

Figure 10:
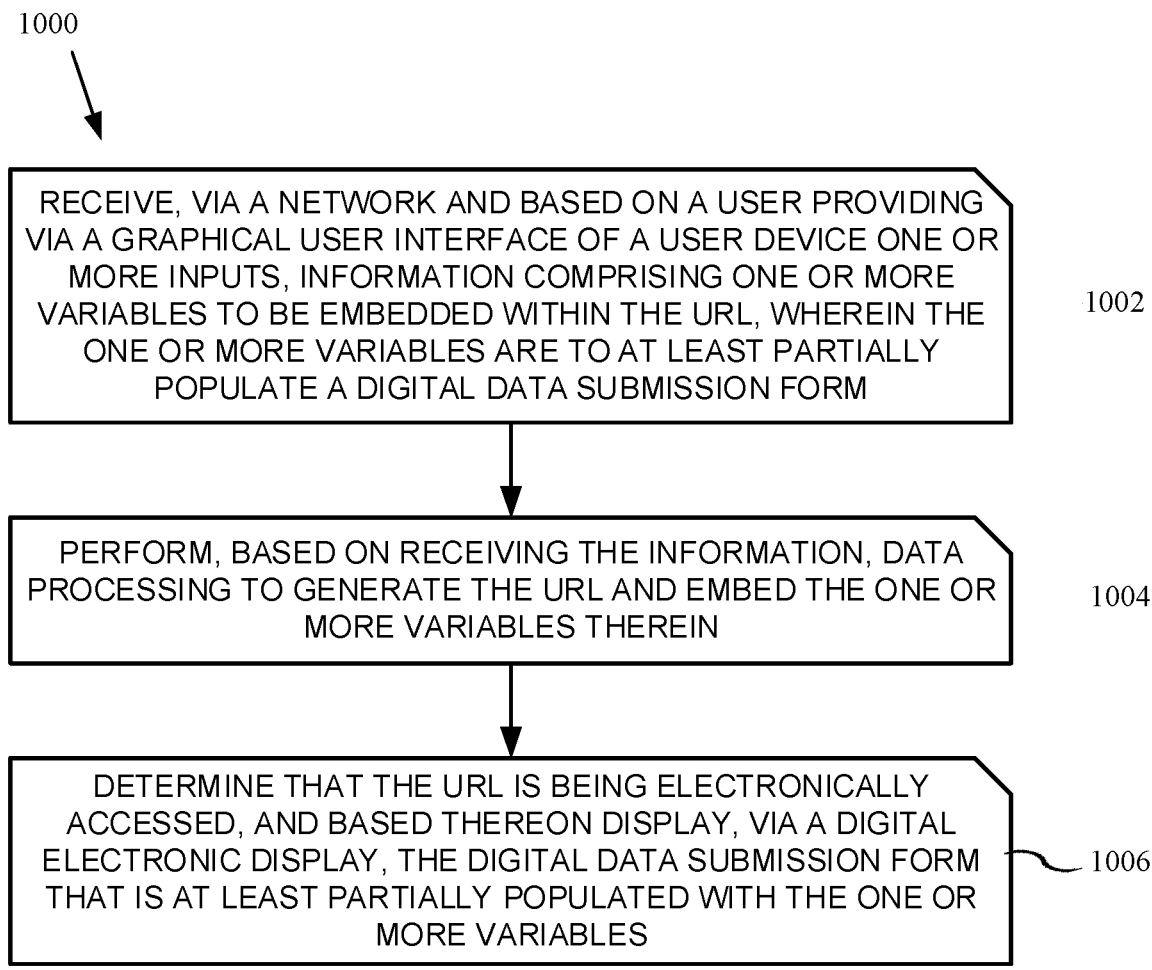
FIG. 10 depicts a block diagram of an example method for embedding a URL with one or more embedded variables, in accordance with an embodiment of the present invention.

FIG. 10 depicts a block diagram of an example method 1000 for embedding a URL with one or more embedded variables, in accordance with an embodiment of the present invention. At block 1002, information comprising one or more variables to be embedded within the URL is received via a network and based on a user providing one or more inputs via a graphical user interface of a user device, where the one or more variables are to at least partially populate a digital data submission form. According to one embodiment, the one or more variables include entity information associated with an entity, and in one example the entity includes a product retailer. According to one embodiment, the information comprising the one or more variables to be embedded within the URL is received based on the one or more inputs being provided in order to access a web portal. In particular, according to one embodiment, the one or more inputs include authentication information and the web portal includes a web portal account associated with an enterprise. The enterprise may, according to one embodiment, offer the purchasable product for purchase.

At block 1004, based on receiving the information, data processing is performed to generate the URL and embed the one or more variables therein. At block 1006, it is determined that the URL is being electronically accessed and based thereon, the digital data submission form that is at least partially populated with the one or more variables is transmitted for display via a digital electronic display. According to one embodiment, based on the user providing one or more additional inputs through a web portal, additional information indicating one or more additional variables to populate a portion of the digital data submission form not previously populated by the one or more variables is received. According to one embodiment, the one or more additional variables comprise product information associated with a purchasable product. Further, according to one embodiment, based on receiving the additional information, additional data processing is performed to embed the one or more additional variables within the variable data.

Figure 11:
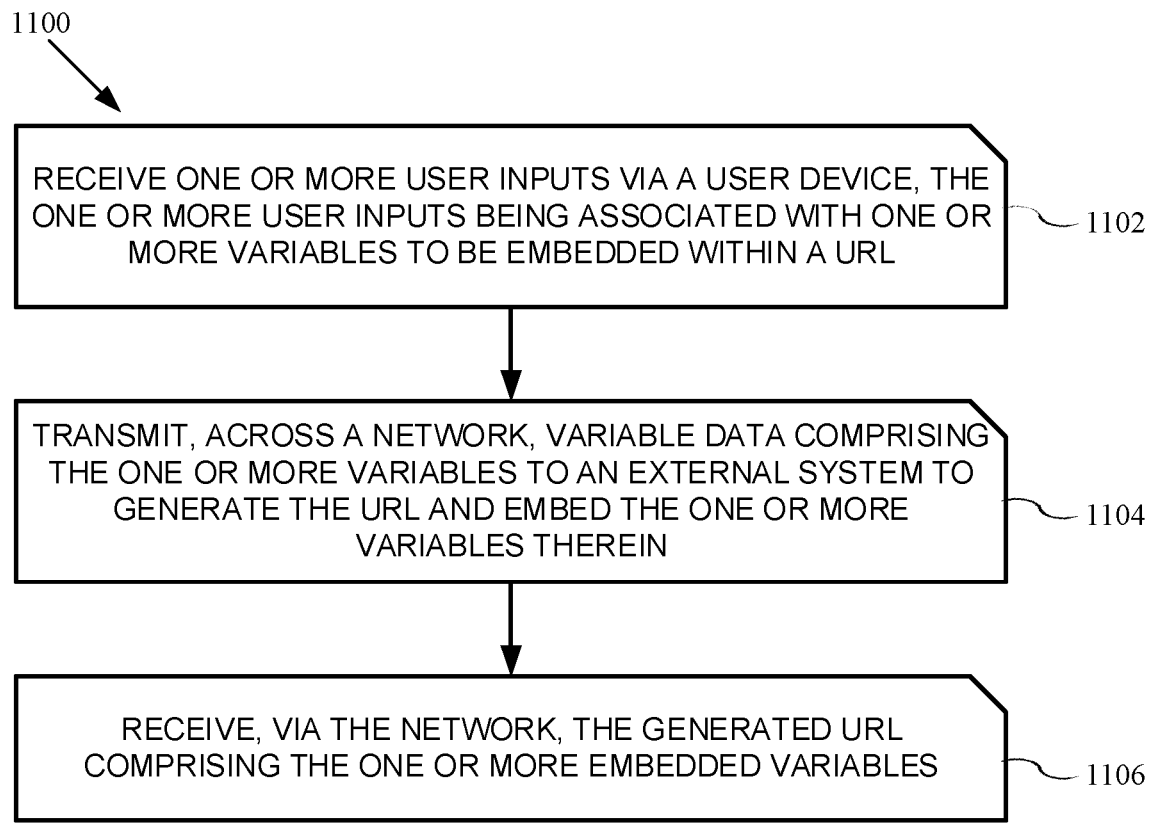
FIG. 11 depicts a block diagram of an example method for embedding a URL with one or more embedded variables, in accordance with an embodiment of the present invention.

FIG. 11 depicts a block diagram of an example method 1100 for embedding a URL with one or more embedded variables, in accordance with an embodiment of the present invention. At block 1102, one or more user inputs are received via a user device, where the one or more user inputs are associated with one or more variables to be embedded within a URL. According to one embodiment, the one or more user inputs include authentication information to authenticate a user of the user device. In particular, according to one embodiment, the one or more user inputs are provided to access a web portal account associated with an enterprise and based on the authentication information being verified, the one or more variables to be embedded in the URL include enterprise information about the enterprise. According to one embodiment, the method 1100 further includes creating a data structure comprising variable data. At block 1104, variable data comprising the one or more variables are transmitted across a network to an external system to generate the URL and embed the one or more variables therein. At block 1106, he generated URL comprising the one or more embedded variables is received via the network. According to one embodiment, the method 1100 further includes receiving one or more additional user inputs associated with one or more additional variables, where the transmitted variable data further includes the one or more additional variables. Additionally, transmitting the variable data that further comprises the one or more additional variables facilitates further embedding the one or more additional variables within the URL. According to one embodiment, the one or more additional variables include product information associated with a purchasable product.

Figure 12:
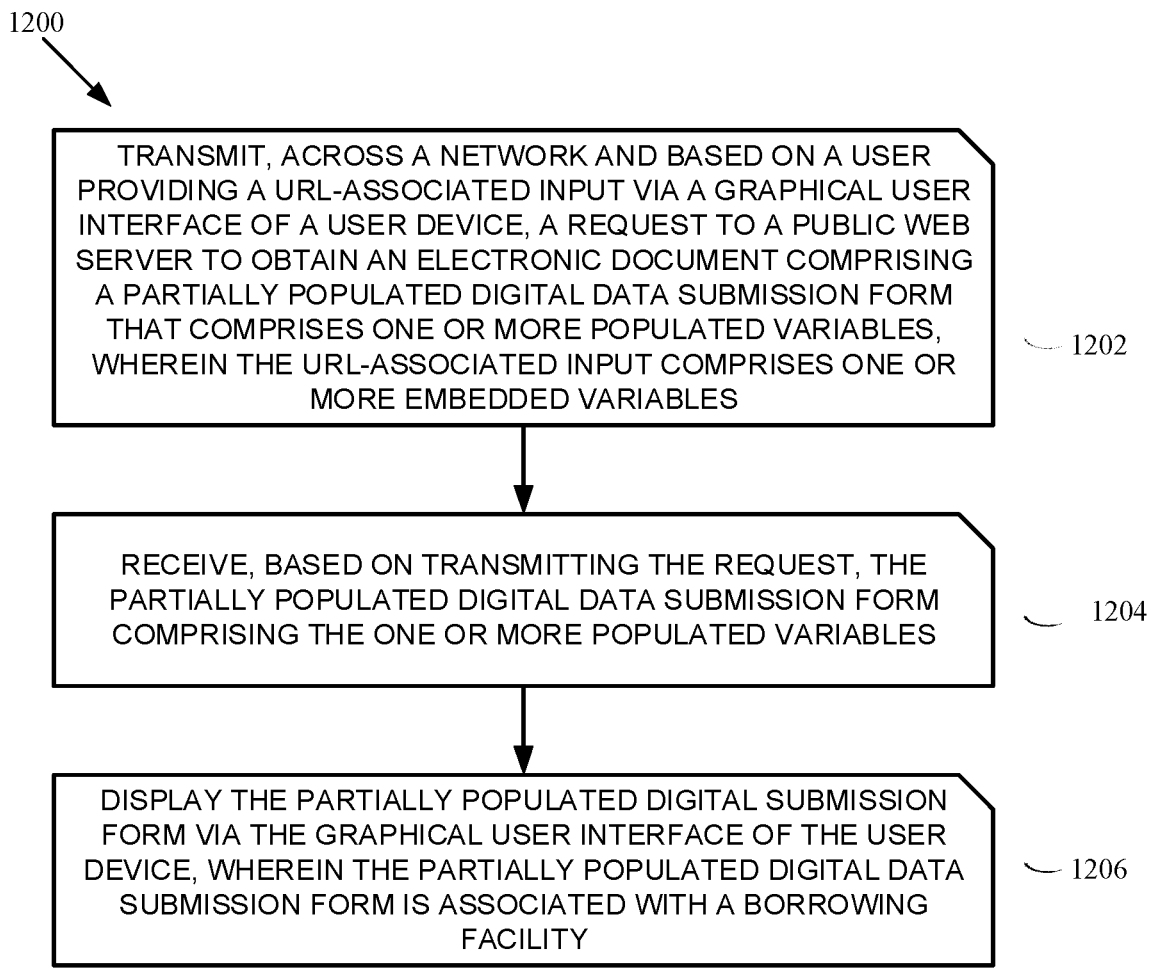
FIG. 12 depicts a block diagram of an example method for data transmission, in accordance with an embodiment of the present invention.

FIG. 12 depicts a block diagram of an example method 1200 for data transmission, in accordance with an embodiment of the present invention. At block 1202 the computer system transmits, across a network and based on a user providing a URL-associated input via a graphical user interface of a user device, a request to a public web server to obtain an electronic document comprising a partially populated digital data submission form that comprises one or more populated variables, wherein the URL-associated input comprises one or more embedded variables. At block 1204, based on transmitting the request, the partially populated digital data submission form comprising the one or more populated variables is received. In some embodiments, the digital data submission form comprises partially populated form fields (e.g., text fields, check boxes, radio buttons, various other input elements or the like).

At block 1206, the partially populated digital submission form is displayed via the graphical user interface of the user device, where the partially populated digital data submission form is associated with a borrowing facility. The borrowing facility may include a loan, a financing product, a credit facility (e.g., a line of credit), a debt facility, or the like. In some embodiments, the variables may include entity information associated with a product retailer entity such as, for example the name of the product retailer, the address of the product retailer, the state of the product retailer, etc. In some embodiments the variables may include information about a purchasable product that can be financed using the borrowing facility.

According to various embodiments, the method 1200 further includes identifying that the user has selected, via the graphical user interface, an interactive element, wherein the selection of the interactive element comprises the URL associated input provided by the user. In some embodiments, the method 1200 may include receiving, in response to the partially populated digital submission form being displayed and based on the user providing one or more additional inputs through a web portal to modify the displayed partially populated digital submission form, additional information indicating one or more additional variables to populate a portion of the partially populated digital submission form not previously populated by the one or more populated variables. In various embodiments, the one or more additional variables may include product information associated with a purchasable product. In some embodiments, the one or more additional variables include inputs provided via form fields of the partially populated digital submission form. The additional information may also include, according to some embodiments, personal information (e.g., a credit score, personally identifying information, employment information, etc.) and the one or more additional variables include financial data associated with the user. The financial data associated with the user may be analyzable by the public web server to select terms (e.g., interest rates, borrowing terms, and disclaimers) of the borrowing facility from a plurality of selectable borrowing terms (e.g. current promotions, adjustable vs. fixed interest rates, duration of payments, etc.). Further, the method 1200 may also include receiving, via the public web server, an indication of the selected terms of the borrowing facility. For instance, the indication of the selected terms of the borrowing facility may be communicated to the user via an electronic communication means selected from the group consisting of a hypertext document (e.g. a webpage), a short message service (SMS) text message, and an email message.

In some embodiments, the partially populated digital data submission form may be received from the public web server via a hypertext document. In some embodiments, the method 1200 may include transmitting across the network a phone number of the user, which enables the partially populated digital data submission form to be received via SMS text message to the transmitted phone number of the user. In some embodiments, the method 1200 may include transmitting, across the network, an email address of the user, which enables the partially populated digital data submission form to be received via electronic mail as an email message sent to the email address of the user.

In some embodiments, the partially populated digital submission form is partially populated with financing information associated with the borrowing facility (e.g., a financing product, a credit facility, a debt facility, or the like), where the financing information is selected from the group consisting of interest rates, borrowing terms, disclaimers. In other embodiments the financing information may include additional information related to loans and/or financing that would allow the user to borrow money to purchase a purchasable product or service. In some embodiments, the partially populated digital submission form is partially populated with information selected from the group consisting of retail location information (e.g., the location where the product/service is purchasable), product information (e.g. information about the product/service) and financing information.

Figure 13:
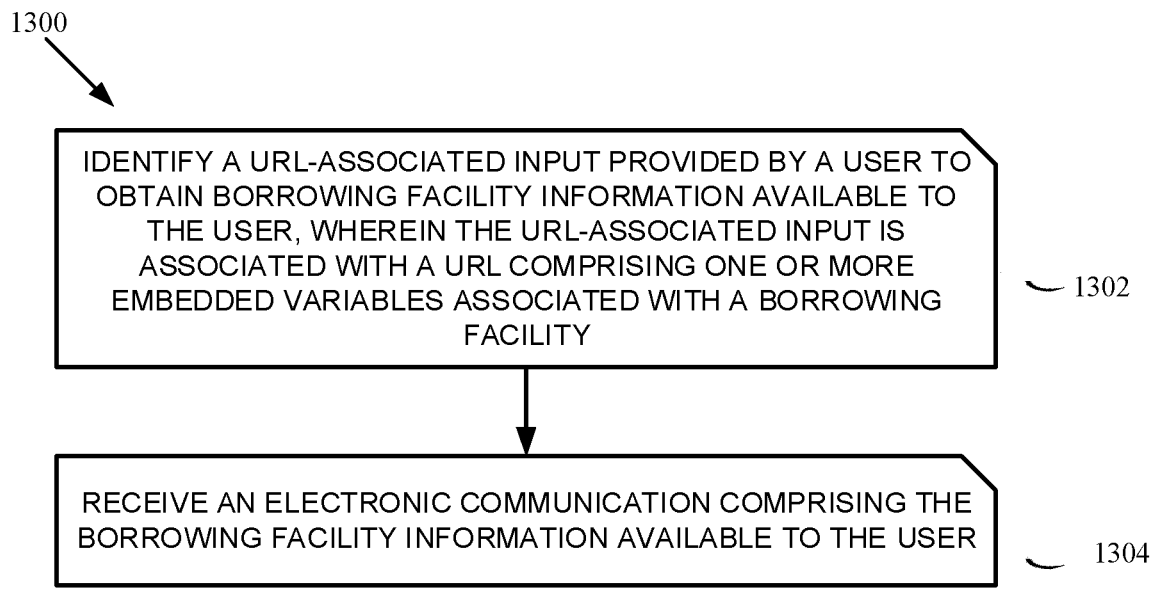
FIG. 13 depicts a block diagram of an example method for data transmission, in accordance with an embodiment of the present invention.

FIG. 13 depicts a block diagram of an example method 1300 for data transmission, in accordance with an embodiment of the present invention. At block 1302 the computing system identifies a URL-associated input provided by a user to obtain borrowing facility information available to the user, wherein the URL-associated input is associated with a URL comprising one or more embedded variables associated with a borrowing facility. According to one embodiment, the URL-associated input is identified based on the user selecting a link comprising the URL. Alternatively, according to various embodiments, the URL-associated input is identified based on the user inputting the URL into an input field of a web browser. At block 1304, the computing system receives an electronic communication comprising the borrowing facility information available to the user. According to various embodiments, the electronic communication is selected from the group consisting of a hypertext document (e.g., a webpage), a short message service (SMS) text message, and an email message. In some embodiments, the phone number and/or email address of the user are received based on inputs provided by the user prior to receiving the electronic communication. According to various embodiments, the borrowing facility information is selected from the group consisting of interest rates, borrowing terms, and disclaimers. Various other borrowing facility information such as that described above may also be obtained.

Figure 14:
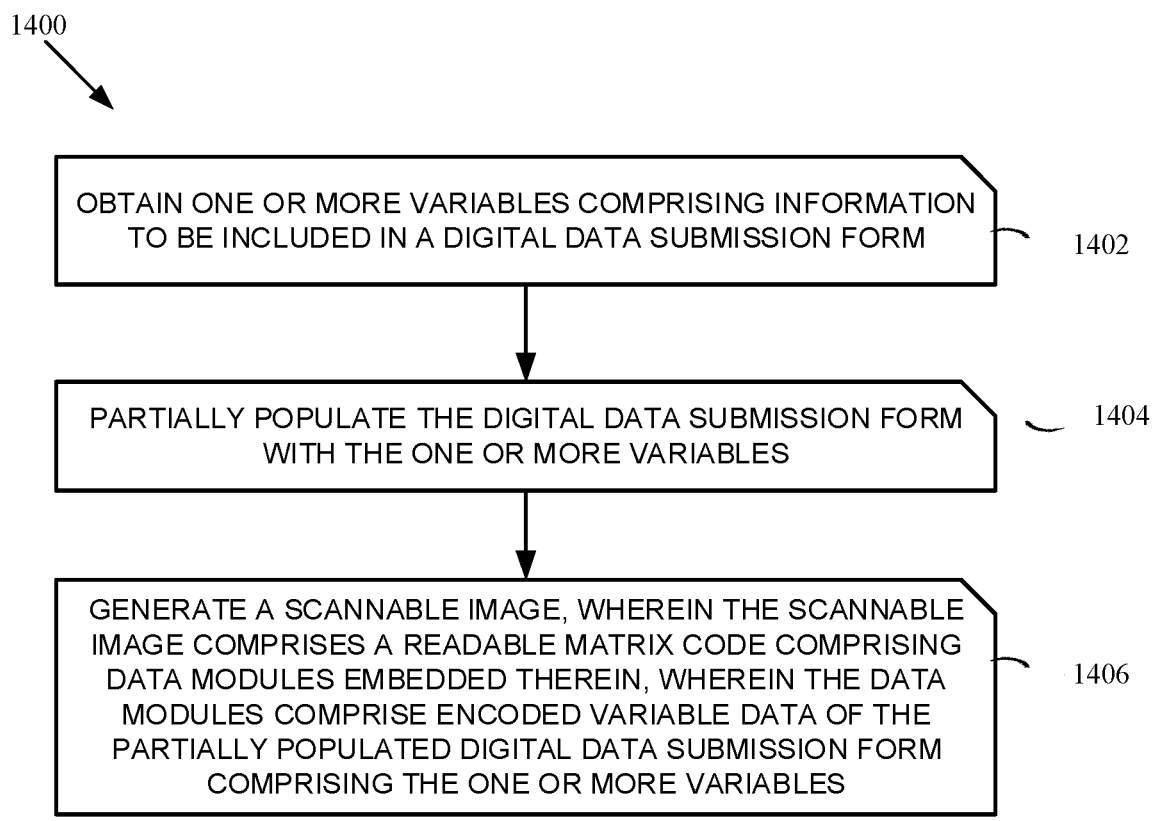
FIG. 14 depicts a block diagram of an example method for data transmission, in accordance with an embodiment of the present invention.

FIG. 14 depicts a block diagram of an example method 1400 for data transmission, in accordance with an embodiment of the present invention. At block 1402, the computing system obtains one or more variables comprising information to be included in a digital data submission form. Further, at block 1404, the computing system partially populates the digital data submission form with the one or more variables. At block 1406, the computing system generates a scannable image, wherein the scannable image comprises a readable matrix code comprising data modules embedded therein, wherein the data modules comprise encoded variable data of the partially populated digital data submission form comprising the one or more variables.

According to various embodiments, the scannable image is configured to provide, based on the scannable image being scanned, a representation of an interactive element comprising a URL-based link to the partially populated digital data submission form, and wherein the one or more variables are selected from the group consisting of product information associated with a purchasable product, retail location information of a retail location, and financing information associated with a borrowing facility.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®", "Windows®", "macOS®", "iOS®", "Android®", and the like may be subject to trademark rights in various jurisdictions throughout the world and are used here only in reference to the products or services properly denominated by the marks to the extent that such trademark rights may exist.

What is claimed is:

1. A computer system for deciphering matrix code via an image sensor for embedded variable identification, the computer system comprising:
   one or more processors in communication with a memory; and
   program instructions stored by the memory and executable by the one or more processors to:
   detect, via the image sensor of an optical instrument of a user device and while the user device is physically located in a showroom of an enterprise, presence of a scannable object within an image captured by the optical instrument, the detecting comprising defining a bounding region encompassing the scannable object and the scannable object comprising readable matrix code, wherein the scannable object is printed and coupled to a physical purchasable product currently located in the showroom;
   contemporaneously perform, via the image sensor and based on detecting the presence of the scannable object, pattern recognition on the readable matrix code of the scannable object to decipher the readable matrix code and identify data modules embedded within the scannable object, wherein the data modules comprise encoded data comprising one or more embedded variables, the one or more embedded variables including a geolocation of the showroom of the enterprise;
   transmit, via a network and based on detecting the data modules from the scannable object, the encoded data to an external server to initiate one or more server operations comprising data processing to, at least in part, (i) select a financing-related item determined to be available to a user from one or more selectable items potentially available to the user, the financing-related item enabling the user to purchase the physical purchasable product currently located in the showroom, (ii) generate element data comprising a hyperlink associated with the selected financing-related item, and (iii) ascertain, using the geolocation of the showroom, dealership information that is specific to the physical purchasable product;
   receive, via the external server, the element data comprising the hyperlink that, upon selection, initiates display of a digital financing application to apply for the financing-related item, the digital financing application being at least partially populated with information specific to the physical purchasable product that includes the ascertained dealership information;
   digitally display, via a user interface of the user device, a representation of the hyperlink; and
   receive, an indication selecting the hyperlink to directly initiate display, via the user interface, of the digital financing application to apply for the financing-related item, the digital financing application being at least partially populated with information specific to the physical purchasable product including the dealership information ascertained using the geolocation of the showroom, a dealer account, a product manufacturer of the physical purchasable product currently located in the showroom, model type, model year, and model number.

2. The computing system for deciphering matrix code via an image sensor for embedded variable identification according to claim 1, wherein the optical instrument further comprises one or more lenses and the image sensor is configured to convert photons that pass through the one or more lenses into an electrical signal.

3. The computing system for deciphering matrix code via an image sensor for embedded variable identification according to claim 1, wherein the readable matrix code comprises two-dimensional code encoding the encoded data that includes the one or more embedded variables.

4. The computing system for deciphering matrix code via an image sensor for embedded variable identification according to claim 1, wherein the financing-related item includes a marketing incentive associated therewith, where the marketing incentive is selected from the group consisting of a promotion, an offer, a sale, an interest rate, and a discount.

5. The computing system for deciphering matrix code via an image sensor for embedded variable identification according to claim 4, wherein marketing incentive is associated with a financing incentive to purchase the physical purchasable product.

6. The computing system for deciphering matrix code via an image sensor for embedded variable identification according to claim 1, wherein the program instructions are further executable by the one or more processors to:
   receive, via the user interface, personally identifiable information of the user to populate a portion of the digital financing application not previously populated with the information specific to the physical purchasable product; and
   transmit, via the network to an enterprise system, a completed version of the digital financing application, the completed version comprising the portion populated with the personally identifiable information.

7. The computing system for deciphering matrix code via an image sensor for embedded variable identification according to claim 6, wherein the enterprise system comprises the external server.

8. A computing system for deciphering matrix code via an image sensor for embedded variable identification, the computer system comprising:
   one or more processors in communication with a memory; and
   program instructions stored by the memory and executable by the one or more processors to:
   scan, via an optical instrument of a user device while physically located at an enterprise location, a scannable object comprising matrix code, the optical instrument comprising the image sensor and the scanning including using the image sensor of the optical instrument to decipher the matrix code, the matrix code including embedded data modules indicating a for determining a geolocation of the enterprise location, wherein the scannable object initiates retrieval of 1) a digital loan application, 2) a marketing incentive, the digital loan application and the marketing incentive being associated with a purchasable product or service available at the enterprise location, and 3) dealership information, ascertained using the geolocation of the enterprise location, that is specific to the physical purchasable product;

receive, via an external server and in response to scanning the scannable object, element data comprising the marketing incentive, wherein the element data comprises a hyperlink associated with the marketing incentive;

display, via a user interface of a user device, a visual representation of the hyperlink;

receive, via the user interface, an input selecting the of hyperlink; and display, in response to receiving the input, a digital landing page that displays 1) the digital loan application and 2) the marketing incentive, where the digital loan application is at least partially populated with the dealership information that includes the ascertained dealership information using the geolocation of the enterprise location, a dealer account, a product manufacturer of the physical purchasable product currently located in the enterprise location, model type, model year, and model number.

9. The computing system for deciphering matrix code via an image sensor for embedded variable identification according to claim 8, wherein the optical instrument further comprises one or more lenses, wherein the image sensor is configured to convert photons that pass through the one or more lenses into an electrical signal.

10. The computing system for deciphering matrix code via an image sensor for embedded variable identification according to claim 8, wherein the marketing incentive is selected, by the external server, from a plurality of marketing incentives having differing values, and wherein the marketing incentive is identified based on comparing the plurality of marketing incentives and determining that the identified marketing incentive provides a relatively highest value to the user.

11. The computing system for deciphering matrix code via an image sensor for embedded variable identification according to claim 10, wherein the determining that the identified items provides the relatively highest value is based on the external server determining that purchase of the purchasable product or service satisfies one or more criteria that is needed to qualify for the identified item, wherein the one or more criteria comprise an eligibility time period and the determining that purchasing the purchasable product or service satisfies the one or more criteria to qualify for the identified item is based, at least in part, on the external server determining that a current time period is within the eligibility time period, the current time period including a time when the scannable object is scanned.

12. The computing system for deciphering matrix code via an image sensor for embedded variable identification according to claim 11, wherein determining that purchasing the purchasable product or service satisfies the one or more criteria to qualify for the identified item is based, at least in part, on embedded data embedded within the scannable object.

13. A computer-implemented method for deciphering matrix code via an image sensor for embedded variable identification, the method comprising:

detecting, via the image sensor of an optical instrument of a user device and while the user device is physically located in a showroom of an enterprise, presence of a scannable object within an image captured by the optical instrument, the detecting comprising defining a bounding region encompassing the scannable object and the scannable object comprising readable matrix code, wherein the scannable object is printed and coupled to a physical purchasable product currently located in the showroom;

contemporaneously performing, via the image sensor and based on detecting the presence of the scannable object, pattern recognition on the readable matrix code of the scannable object to decipher the readable matrix code and identify data modules embedded within the scannable object, wherein the data modules comprise encoded data comprising one or more embedded variables, the one or more embedded variables including a geolocation of the showroom of the enterprise;

transmitting, via a network and based on detecting the data modules from the scannable object, the encoded data to an external server to initiate one or more server operations comprising data processing to, at least in part, (i) select a financing-related item determined to be available to a user from one or more selectable items potentially available to the user, the financing-related item enabling the user to purchase the physical purchasable product currently located in the showroom (ii) generate element data comprising a hyperlink associated with the financing-related item, and (iii) ascertain, using the geolocation of the showroom, dealership information that is specific to the physical purchasable product;

receiving, via the external server, the element data comprising the hyperlink that, upon selection, initiates display of a digital financing application to apply for the financing-related item, the digital financing application being at least partially populated with information specific to the physical purchasable product that includes the ascertained dealership information; and digitally displaying, via a user interface of the user device, a representation of the hyperlink; and receiving an indication selecting the hyperlink to directly initiate display, via the user interface, of the digital financing application to apply for the financing-related item, the digital financing application being at least partially populated with information specific to the physical purchasable product including the dealership information ascertained using the geolocation of the showroom, a dealer account, a product manufacturer of the physical purchasable product currently located in the showroom, model type, model year, and model number.

14. The computer-implemented method for deciphering matrix code via an image sensor for embedded variable identification according to claim 13, wherein the method further comprises:

receiving, via the user interface, personally identifiable information of the user to populate a portion of the digital financing application not previously populated with the information specific to the physical purchasable product; and transmitting, via the network to an enterprise system, a completed version of the digital financing application, the completed version comprising the portion populated with the personally identifiable information.

* * * * *